(12) United States Patent
Wood et al.

(10) Patent No.: US 11,161,762 B2
(45) Date of Patent: Nov. 2, 2021

(54) ADVANCED OXIDATION PROCESS FOR EX-SITU GROUNDWATER REMEDIATION

(71) Applicant: Evoqua Water Technologies LLC, Pittsburgh, PA (US)

(72) Inventors: Jonathan H Wood, Needham, MA (US); Sevang Doung, Lowell, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/354,405

(22) Filed: Mar. 15, 2019

(65) Prior Publication Data

US 2019/0218127 A1    Jul. 18, 2019

Related U.S. Application Data

(63) Continuation-in-part of application No. 15/002,474, filed on Jan. 21, 2016, now Pat. No. 10,494,281.

(Continued)

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/008* (2013.01); *C02F 1/325* (2013.01); *C02F 1/42* (2013.01);
(Continued)

(58) Field of Classification Search
None
See application file for complete search history.

(56) References Cited

U.S. PATENT DOCUMENTS 2,008,684 A    7/1935  Craddock
2,212,260 A    8/1940  Brothman
(Continued)

FOREIGN PATENT DOCUMENTS

CA    10-79423 A1    6/1980
CN    1098960        2/1995
(Continued)

OTHER PUBLICATIONS

Liu, et al, "In Situ Chemical Oxidation of Contaminated Groundwater by Persulfate: Decomposition by Fe(III- and Mn (IV)- Containing Oxides and Aquifer Materials," Environ. Sci. Technol., pp. 10330-10336, 2014.

(Continued)

*Primary Examiner* — Richard C Gurtowski

(57) ABSTRACT

Methods of treating contaminated groundwater having recalcitrant organic contaminants are disclosed. The methods include pretreating the contaminated groundwater to remove iron, introducing a persulfate to the contaminated groundwater, and exposing the contaminated groundwater to irradiation. The methods may also include extracting the contaminated groundwater from a feed stream. The methods may also include preparing the persulfate with high purity water. Systems for treating contaminated groundwater having recalcitrant organic contaminants are also disclosed. The systems include a pretreatment subsystem, a source of persulfate, and an irradiation source.

20 Claims, 14 Drawing Sheets

Related U.S. Application Data

(60) Provisional application No. 62/105,811, filed on Jan. 21, 2015, provisional application No. 62/203,644, filed on Aug. 11, 2015, provisional application No. 62/644,058, filed on Mar. 16, 2018.

(51) Int. Cl.

| | | |
|---|---|---|
| C02F 1/32 | (2006.01) | |
| C02F 1/72 | (2006.01) | |
| C02F 1/76 | (2006.01) | |
| C02F 1/44 | (2006.01) | |
| C02F 1/42 | (2006.01) | |
| C02F 101/34 | (2006.01) | |
| C02F 101/36 | (2006.01) | |
| C02F 101/38 | (2006.01) | |
| C02F 101/30 | (2006.01) | |
| C02F 103/06 | (2006.01) | |
| C02F 101/20 | (2006.01) | |

(52) U.S. Cl.
CPC .............. C02F 1/441 (2013.01); C02F 1/722 (2013.01); C02F 1/727 (2013.01); C02F 1/763 (2013.01); C02F 2101/203 (2013.01); C02F 2101/305 (2013.01); C02F 2101/34 (2013.01); C02F 2101/36 (2013.01); C02F 2101/38 (2013.01); C02F 2103/06 (2013.01); C02F 2201/008 (2013.01); C02F 2209/20 (2013.01)

(56) References Cited

U.S. PATENT DOCUMENTS

| | | |
|---|---|---|
| 2,249,263 A | 7/1941 | Wheelwright, Jr. |
| 2,268,461 A | 12/1941 | Nichols |
| 2,556,014 A | 6/1951 | Tolman |
| 2,651,582 A | 9/1953 | Courtney |
| 2,686,110 A | 8/1954 | Carver |
| 2,740,696 A | 4/1956 | Longwell |
| 3,252,689 A | 5/1966 | Blomgren, Sr. et al. |
| 3,319,937 A | 5/1967 | Wilson et al. |
| 3,389,970 A | 6/1968 | Scheibel |
| 3,536,646 A | 10/1970 | Hatch et al. |
| 3,559,959 A | 2/1971 | Davis et al. |
| 3,702,298 A | 11/1972 | Zsoldos et al. |
| 3,742,735 A | 7/1973 | Verreyne et al. |
| 3,747,899 A | 7/1973 | Latinen et al. |
| 3,756,570 A | 9/1973 | Buhner |
| 3,794,817 A | 2/1974 | Shinskey |
| 3,852,234 A | 12/1974 | Venema |
| 3,870,631 A | 3/1975 | Fassell et al. |
| 3,965,027 A | 6/1976 | Boffardi et al. |
| 4,016,078 A | 4/1977 | Clark |
| 4,087,360 A | 5/1978 | Faust et al. |
| 4,113,688 A | 9/1978 | Pearson |
| 4,125,574 A | 11/1978 | Kastner et al. |
| 4,146,676 A | 3/1979 | Saeman et al. |
| 4,171,166 A | 10/1979 | Trowbridge et al. |
| 4,217,145 A | 8/1980 | Gaddis |
| 4,218,147 A | 8/1980 | Rosenberger |
| 4,233,265 A | 11/1980 | Gasper |
| 4,234,440 A | 11/1980 | Hirozawa et al. |
| 4,241,016 A | 12/1980 | Hirozawa et al. |
| 4,243,636 A | 1/1981 | Shiraki et al. |
| 4,277,438 A | 7/1981 | Ejzak |
| 4,300,909 A | 11/1981 | Krumhansl |
| 4,340,489 A | 7/1982 | Adams et al. |
| 4,402,836 A | 9/1983 | Fochtman et al. |
| 4,433,701 A | 2/1984 | Cox et al. |
| 4,456,512 A | 6/1984 | Bieler et al. |
| 4,470,907 A | 9/1984 | Sencza |
| 4,522,502 A | 6/1985 | Brazelton |
| 4,550,011 A | 10/1985 | McCollum |
| 4,575,678 A | 3/1986 | Hladky |
| 4,581,074 A | 4/1986 | Mankina et al. |
| 4,648,043 A | 3/1987 | O'Leary |
| 4,664,528 A | 5/1987 | Rodgers et al. |
| 4,701,055 A | 10/1987 | Anderson |
| 4,719,252 A | 1/1988 | Dutton et al. |
| 4,747,978 A | 5/1988 | Loehr et al. |
| 4,752,740 A | 6/1988 | Steininger |
| 4,798,702 A | 1/1989 | Tucker |
| 4,830,721 A | 5/1989 | Bianchi et al. |
| 4,863,608 A | 9/1989 | Kawai et al. |
| 4,913,822 A | 4/1990 | Chen et al. |
| 4,952,376 A | 8/1990 | Peterson |
| 4,965,016 A | 10/1990 | Saitoh et al. |
| 4,977,292 A | 12/1990 | Hwa et al. |
| 4,990,260 A | 2/1991 | Pisani |
| 5,000,866 A | 3/1991 | Woyciesjes |
| 5,004,549 A | 4/1991 | Wood et al. |
| 5,018,871 A | 5/1991 | Brazelton et al. |
| 5,024,766 A | 6/1991 | Mahmud |
| 5,030,334 A | 7/1991 | Hale |
| 5,032,218 A | 7/1991 | Dobson |
| 5,061,456 A | 10/1991 | Brazelton et al. |
| 5,069,885 A | 12/1991 | Ritchie |
| 5,073,268 A | 12/1991 | Saito et al. |
| 5,112,521 A | 5/1992 | Mullins et al. |
| 5,116,509 A | 5/1992 | White |
| 5,118,422 A | 6/1992 | Cooper et al. |
| 5,130,033 A | 7/1992 | Thornhill |
| 5,135,968 A | 8/1992 | Brazelton et al. |
| 5,139,627 A | 8/1992 | Eden et al. |
| 5,164,429 A | 11/1992 | Brazelton et al. |
| 5,213,694 A | 5/1993 | Craig |
| 5,230,822 A | 7/1993 | Kamel et al. |
| 5,236,602 A | 8/1993 | Jackson |
| 5,239,257 A | 8/1993 | Muller et al. |
| 5,256,307 A | 10/1993 | Bachhofer et al. |
| 5,262,963 A | 11/1993 | Stana et al. |
| 5,302,356 A | 4/1994 | Shadman et al. |
| 5,306,355 A | 4/1994 | Lagana |
| 5,306,432 A | 4/1994 | Puetz |
| 5,316,031 A | 5/1994 | Brazelton et al. |
| 5,320,748 A | 6/1994 | Dupuis |
| 5,332,511 A | 7/1994 | Gay et al. |
| 5,348,665 A | 9/1994 | Schulte et al. |
| 5,352,359 A | 10/1994 | Nagai et al. |
| 5,382,367 A | 1/1995 | Zinkan et al. |
| 5,422,013 A | 6/1995 | Hirofuji |
| 5,422,014 A | 6/1995 | Allen et al. |
| 5,424,032 A | 6/1995 | Christensen et al. |
| 5,443,991 A | 8/1995 | Godec et al. |
| 5,470,480 A | 11/1995 | Gray et al. |
| 5,489,344 A | 2/1996 | Martin et al. |
| 5,494,588 A | 2/1996 | LaZonby |
| 5,501,801 A | 3/1996 | Zhang et al. |
| 5,518,629 A | 5/1996 | Perez et al. |
| 5,571,419 A | 11/1996 | Obata et al. |
| 5,573,662 A | 11/1996 | Abe et al. |
| 5,575,920 A | 11/1996 | Freese et al. |
| 5,587,069 A | 12/1996 | Downey, Jr. |
| 5,639,476 A | 6/1997 | Oshlack et al. |
| 5,658,467 A | 8/1997 | LaZonby et al. |
| 5,675,153 A | 10/1997 | Snowball |
| 5,683,654 A | 11/1997 | Dallmier et al. |
| 5,720,869 A | 2/1998 | Yamanaka et al. |
| 5,736,097 A | 4/1998 | Ono |
| 5,753,106 A | 5/1998 | Schenck |
| 5,770,039 A | 6/1998 | Rigney et al. |
| 5,779,912 A | 7/1998 | Gonzalez-Martin et al. |
| 5,783,092 A | 7/1998 | Brown et al. |
| 5,785,845 A | 7/1998 | Colaiano |
| 5,785,867 A | 7/1998 | LaZonby et al. |
| 5,790,934 A | 8/1998 | Say et al. |
| 5,798,271 A | 8/1998 | Godec et al. |
| 5,800,732 A | 9/1998 | Coughlin et al. |
| 5,814,233 A | 9/1998 | Starkey et al. |
| 5,814,247 A | 9/1998 | Derule et al. |
| 5,820,256 A | 10/1998 | Morrison |
| 5,849,985 A | 12/1998 | Tieckelmann et al. |
| 5,855,791 A | 1/1999 | Hays et al. |
| 5,858,246 A | 1/1999 | Rafter et al. |

(56) References Cited

U.S. PATENT DOCUMENTS

| | | |
|---|---|---|
| 5,858,249 A | 1/1999 | Higby |
| 5,866,013 A | 2/1999 | Kessler et al. |
| 5,882,526 A | 3/1999 | Brown et al. |
| 5,888,374 A | 3/1999 | Pope et al. |
| 5,895,565 A | 4/1999 | Steininger et al. |
| 5,902,751 A | 5/1999 | Godec et al. |
| 5,947,596 A | 9/1999 | Dowd |
| 5,980,758 A | 11/1999 | LaZonby et al. |
| 5,985,155 A | 11/1999 | Maitland |
| 6,015,484 A | 1/2000 | Martinchek et al. |
| 6,030,842 A | 2/2000 | Peachey-Stoner |
| 6,045,706 A | 4/2000 | Morrison et al. |
| 6,063,638 A | 5/2000 | Small et al. |
| 6,068,012 A | 5/2000 | Beardwood et al. |
| 6,090,296 A | 7/2000 | Oster |
| 6,096,283 A | 8/2000 | Cooper et al. |
| 6,106,770 A | 8/2000 | Ohki et al. |
| 6,120,619 A | 9/2000 | Goudiakas et al. |
| 6,120,698 A | 9/2000 | Rounds et al. |
| 6,132,593 A | 10/2000 | Tan |
| 6,143,184 A | 11/2000 | Martin et al. |
| 6,146,538 A | 11/2000 | Martin |
| 6,149,819 A | 11/2000 | Martin et al. |
| 6,159,552 A | 12/2000 | Riman et al. |
| 6,238,555 B1 | 5/2001 | Silveri et al. |
| 6,284,144 B1 | 9/2001 | Itzhak |
| 6,315,950 B1 | 11/2001 | Harp et al. |
| 6,409,926 B1 | 6/2002 | Martin |
| 6,419,817 B1 | 7/2002 | Martin |
| 6,420,715 B1 | 7/2002 | Cormack et al. |
| 6,423,234 B1 | 7/2002 | Martin |
| 6,461,519 B1 | 10/2002 | Weltzer |
| 6,464,867 B1 | 10/2002 | Morita et al. |
| 6,468,433 B1 | 10/2002 | Tribelski |
| 6,503,464 B1 | 1/2003 | Miki et al. |
| 6,596,148 B1 | 7/2003 | Belongia et al. |
| 6,623,647 B2 | 9/2003 | Martin |
| 6,716,359 B1 | 4/2004 | Dennis, II |
| 6,776,926 B2 | 8/2004 | Martin |
| 6,780,238 B2 | 8/2004 | Park |
| 6,780,328 B1 | 8/2004 | Zhang |
| 6,884,391 B1 | 4/2005 | Khoe et al. |
| 6,902,653 B2 | 6/2005 | Carmignani et al. |
| 6,942,779 B2 | 9/2005 | Belongia et al. |
| 6,991,733 B2 | 1/2006 | Kin et al. |
| 6,991,735 B2 | 1/2006 | Martin |
| 7,097,764 B2 | 8/2006 | Neofotistos |
| 7,108,781 B2 | 9/2006 | Martin |
| 7,285,223 B2 | 10/2007 | Marlin |
| 7,507,973 B2 | 3/2009 | Bircher |
| 8,459,861 B2 | 6/2013 | Bircher |
| 8,580,091 B2 | 11/2013 | Niksa et al. |
| 8,741,155 B2 | 6/2014 | Coulter |
| 10,494,281 B2 * | 12/2019 | Szczesniak ............. C02F 1/008 |
| 2001/0007314 A1 | 7/2001 | Sherman |
| 2002/0043650 A1 | 4/2002 | Martin |
| 2002/0117631 A1 | 8/2002 | Gadgil et al. |
| 2002/0152036 A1 | 10/2002 | Martin |
| 2002/0153319 A1 | 10/2002 | Mukhopadhyay |
| 2003/0010695 A1 | 1/2003 | Kool et al. |
| 2003/0019803 A1 | 1/2003 | Woodard et al. |
| 2004/0005242 A1 | 1/2004 | Koulik et al. |
| 2004/0112838 A1 | 6/2004 | Martin |
| 2005/0029170 A1 | 2/2005 | Urquhart et al. |
| 2005/0056597 A1 | 3/2005 | Fries et al. |
| 2005/0139530 A1 | 6/2005 | Heiss |
| 2005/0173341 A1 | 8/2005 | Salinaro |
| 2005/0199483 A1 | 9/2005 | Kroll |
| 2005/0218082 A1 | 10/2005 | Williamson et al. |
| 2005/0263716 A1 | 12/2005 | From et al. |
| 2006/0131245 A1 | 6/2006 | Dennis et al. |
| 2006/0169646 A1 | 8/2006 | Andree et al. |
| 2007/0102359 A1 | 5/2007 | Lombardi et al. |
| 2007/0119779 A1 | 5/2007 | Muramoto et al. |
| 2008/0149485 A1 | 6/2008 | Childers et al. |
| 2008/0152548 A1 | 6/2008 | Clark et al. |
| 2008/0179242 A1 | 7/2008 | Mukhopadhyay |
| 2008/0245738 A1 | 10/2008 | Coulter |
| 2009/0084734 A1 | 4/2009 | Yencho |
| 2009/0145855 A1 | 6/2009 | Day et al. |
| 2009/0194486 A1 | 8/2009 | Martin |
| 2009/0211919 A1 * | 8/2009 | Hegel ...................... C02F 1/42 205/633 |
| 2010/0025337 A1 | 2/2010 | Yencho |
| 2010/0078574 A1 | 4/2010 | Cooper et al. |
| 2010/0118301 A1 | 5/2010 | Vondras et al. |
| 2011/0010835 A1 | 1/2011 | McCague |
| 2011/0024361 A1 | 2/2011 | Schwartzel et al. |
| 2011/0024365 A1 | 2/2011 | Yong et al. |
| 2011/0171080 A1 | 7/2011 | Lo |
| 2011/0209530 A1 | 9/2011 | Coulter |
| 2011/0210048 A1 | 9/2011 | Coulter |
| 2011/0210077 A1 | 9/2011 | Coulter |
| 2011/0210266 A1 | 9/2011 | Coulter |
| 2011/0210267 A1 | 9/2011 | Coulter |
| 2011/0243665 A1 | 10/2011 | Theodore et al. |
| 2011/0259832 A1 | 10/2011 | Castillo Rivera et al. |
| 2011/0318237 A1 | 12/2011 | Woodling et al. |
| 2012/0048744 A1 | 3/2012 | Kim et al. |
| 2014/0144821 A1 | 5/2014 | Sitkiewitz et al. |
| 2014/0263092 A1 | 9/2014 | Sanchez Cano et al. |
| 2014/0374618 A1 * | 12/2014 | Ide ........................ C02F 1/325 250/431 |

FOREIGN PATENT DOCUMENTS

| | | |
|---|---|---|
| CN | 1539750 | 10/2004 |
| CN | 1625433 A | 6/2005 |
| CN | 201473358 U | 5/2010 |
| DE | 262139 C | 11/1988 |
| DE | 4312417 A1 | 10/1994 |
| DE | 19530086 A1 | 2/1997 |
| DE | 19844179 A1 | 3/2000 |
| DE | 19949434 A1 | 4/2001 |
| EP | 0011776 A1 | 6/1980 |
| EP | 0257740 A1 | 3/1988 |
| EP | 0504621 A1 | 9/1992 |
| EP | 0616975 A2 | 9/1994 |
| EP | 1057784 A1 | 12/2000 |
| FR | 2672058 A1 | 7/1992 |
| GB | 2027004 A | 2/1980 |
| GB | 2281742 A | 3/1995 |
| GB | 23306463 A | 5/1997 |
| GB | 2426513 A | 11/2006 |
| JP | 59-150589 | 8/1984 |
| JP | 60-202792 A | 10/1985 |
| JP | 11-28479 A | 2/1999 |
| JP | 11-033542 A | 2/1999 |
| JP | 11-057752 A | 3/1999 |
| JP | 11-099395 A | 4/1999 |
| JP | 11-290878 A | 10/1999 |
| LU | 80951 A1 | 6/1979 |
| TW | 419440 B | 1/2001 |
| WO | 89/08728 A1 | 9/1989 |
| WO | 95/15294 | 6/1995 |
| WO | 96/30307 A1 | 10/1996 |
| WO | 00/34760 A1 | 6/2000 |
| WO | 01/98558 A2 | 12/2001 |
| WO | 03/031338 A2 | 4/2003 |
| WO | 2004/108607 A1 | 12/2004 |
| WO | 2007/146671 A2 | 12/2007 |
| WO | 2008150541 A1 | 12/2008 |
| WO | 2009/096662 A2 | 8/2009 |

OTHER PUBLICATIONS

FMC Environmental Solutions, "Activated Persulfate Chemistry: Combined Oxidation and Reduction Mechanisms," Peroxygen Talk, Oct. 2010.
"Acu-Trol Programmable Controllers," Product Literature from www.acu-trol.com, printed Nov. 19, 1999.
ACU-TROL Programmable Controllers, "AT-8 Programmable Chemical Controller," Product Literature, 2006.

(56) References Cited

OTHER PUBLICATIONS

ACU-TROL, "Acu-Trol Programmable Controllers: AK100 Series and AK200," Product Literature (date unknown).
ACU-TROL, "AK100 Summary," Product Literature from www.acu-trol.com, printed Nov. 19, 1999.
Anipsitakis, George P. et al., "Transition Meta/UV-based Advanced Oxidation Technologies for Water Decontamination," Applied Catalysis B: Environmental 54 (2004), pp. 155-163.
Bossard, G. et al., "Optimizing Chlorination/Dechlorination at a Wastewater Treatment Plant," reprinted from Public Works, Jan. 1995.
Brusamarello et al., "Analysis of Different Methods to Calculate Electrochemical Noise Resistance Using a Three-Electrode Cell," Corrosion, vol. 56, No. 3, Mar. 2000, pp. 273-282.
Carlson, S., "Fundamentals of water disinfection," J Water SRT—Aqua, vol. 40, No. 6, (1991), pp. 346-356.
Carpenter, Colleen et al., "Chlorine Disinfection of Recreational Water for Cryptosporidium parvum," Emerging Infectious Diseases, vol. 5, No. 4, Jul.-Aug. 1999, pp. 579-584.
CAT Controllers, "CAT 2000+ Programmable Water Chemistry Controller," Product Literature (date unknown).
Cooper, J.F. et al., Final Report: Fiscal Year 1997 Demonstration of Omnivorous Non-Thermal Mixed Waste Treatment Direct Chemical Oxidation of Organic Solids and Liquids using Peroxydisulfate, Lawrenee Livermore National Laboratory, Jan. 1998.
D'Adam, D. et al., "A Case Study of Wastewater Plant Disinfection," reprinted from Public Works Magazine, Nov. 1994.
Dexter et al., "Use and Limitations of Electrochemical Techniques for Investigating Microbiological Corrosion", Corrosion, 1991, vol. 47, No. 4, pp. 308-318.
Eddington, Gordon, "Successfully Managing Wastewater Chlorination," Stranco Product Literature (date unknown).
Frazier, B., "Automation to the Rescue," Aquatics International, May/Jun. 1998.
Gusmano et al., "Electrochemical Noise Resistance as a Tool for Corrosion Rate Prediction", Corrosion, 1997, vol. 53, No. 11, pp. 860-868.
Hensley, R. et al., "Disinfection Metamorphosis: From Chemicals to Control," Operations Forum, vol. 12, No. 4, Apr. 1995.
Hetzler, J.T. et al., "ORP: A Key to Nutrient Removal," Operations Forum, vol. 12, No. 2, Feb. 1995.
Kim, Yong H., "Evaluation of Redox Potential and Chlorine Residual as a Measure of Water Disinfection," presented at the 54th International Water Conference, Pittsburgh, PA, Oct. 11-13, 1993.
Kim, Yong H., "On the Activation of Polymeric Flocculants," AIChE Annual Spring Meeting, Houston, TX, Apr. 2-6, 1989.
Kiser, P. et al., "ORP or Residual: Which Measures Oxidation?" Sep. 10, 1992, pp. 1-7.
Lynntech, Inc., "Electrochemical Ozone Generator," Model 124 Product Literature (date unknown).
Normenausschusse Wasserwesen, "Treatment and disinfection of water used in bathing facilities," DIN 19643-1, Apr. 1997.
Normenausschusse Wasserwesen, "Treatment and disinfection of water used in bathing facilities," DIN 19643-2, Apr. 1997.
Normenausschusse Wasserwesen, "Treatment and disinfection of water used in bathing facilities," DIN 19643-3, Apr. 1997.
Normenausschusse Wasserwesen, "Treatment and disinfection of water used in bathing facilities," DIN 196434, Feb. 1999.
Nowell, Lisa H. et al., "Photolysis of Aqueous Chlorine at Sunlight and Ultraviolet Wavelengths-II. Hydroxyl Radical Production," Water Research, vol. 26, No. 5, May 26, 1992, pp. 599-605, Marsh Barton, Exeter, Great Britain.
Ryan, D. et al., "Waste Not, Want Not: Avoiding Chemical Excesses," reprinted from Operations Forum, vol. 11, No. 4, Apr. 1994.
Sadik W/ & G. Shama, Uv-induced Decolourization ofan Azo Dye by Homogeneous Advanced Oxidation Process, pp. 310-313, 2002.
Santa Barbara Control Systems, "Chemtrol™ PC Programmable Controllers: Integrated Water Treatment with Remote Control," Product Literature, (date unknown).
Scully et al., Disinfection Interference in Wastewaters by Natural Organic Nitrogen Compounds, Environ. Sci. Techn., vol. 30, No. 5, 1996, pp. 1465-1471.
Strand, R. et al., "ORP As a Measure of Evaluating and Controlling Disinfection in Potable Water," (Source and date unknown).
U.S. Filter/STRANCO, "Total Dissolved Solids, Friend or Foe?", Aquatic Technology Newsletter, vol. 1, No. 2, 1988; pp. 1-7.
Victorin et al., "Redox potential measurements for determining the disinfecting power of chlorinated water," J. Hyg., Camb., 70, 1972, pp. 313-323.
White, Geor. Clifford, Handbook of Chlorination and Alternative Disinfectants, Third Edition, (date unknown), pp. 801, 803-809, 922-924.
Yu et al., Free Radical Reactions Involving Cl*, Cl2−*, and SO4−* in the 248 nm Photolysis of Aqueous Solutions Containing $S_2O_8^{2-}$ and Cl−, J. Phys. Chem. A 2004, 108, 295-308.

\* cited by examiner

ADVANCED OXIDATION PROCESS FOR EX-SITU GROUNDWATER REMEDIATION

CROSS REFERENCE TO RELATED APPLICATIONS

This application is a Continuation-in-Part of U.S. patent application Ser. No. 15/002,474, titled "ADVANCED OXIDATION PROCESS FOR EX-SITU GROUNDWATER REMEDIATION" filed Jan. 21, 2016, which claims priority under 35 U. S. C. § 119(e) to U.S. Provisional Application Ser. No. 62/105,811, titled "ADVANCED OXIDATION PROCESS FOR EX-SITU GROUNDWATER REMEDIATION," filed Jan. 21, 2015 and is related to commonly owned U.S. Provisional Application Ser. No. 62/203,644, titled "DESTRUCTION OF TRACE ORGANIC CONTAMINANTS USING AN ADVANCED OXIDATION PROCESS," filed Aug. 11, 2015. This application also claims priority under 35 U. S. C. § 119(e) to U.S. Provisional Application Ser. No. 62/644,058, titled "ADVANCED OXIDATION PROCESS FOR EX-SITU GROUNDWATER REMEDIATION," filed Mar. 16, 2018. Each of these applications is incorporated herein by reference in its entirety for all purposes.

SUMMARY

In accordance with one aspect, there is provided a method of treating contaminated groundwater having an initial concentration of a recalcitrant organic contaminant and an initial concentration of iron. The method may comprise pretreating the contaminated groundwater to produce a pretreated groundwater having a concentration of iron less than the initial concentration of iron. The method may comprise introducing a persulfate to the pretreated groundwater to produce a first treated aqueous solution. The method may comprise exposing the first treated aqueous solution to irradiation to produce a second treated aqueous solution. The second treated aqueous solution may have a concentration of the recalcitrant organic contaminant that is at least 50% less than the initial concentration of recalcitrant organic contaminant.

In some embodiments, pretreating the contaminated groundwater may comprise at least one of oxidizing the contaminated groundwater and treating the contaminated groundwater with a filtration media. The method may comprise introducing a source of chlorine or an oxygen containing gas to the contaminated groundwater. The method may comprise treating the contaminated groundwater with the filtration media selected from manganese dioxide, manganese oxide, and silica.

In some embodiments, the concentration of iron in the pretreated groundwater may be less than a concentration sufficient to deactivate the persulfate. For instance, the concentration of iron in the pretreated groundwater may be 0.1 mg/L or less.

The method may further comprise recirculating at least a portion of the second treated aqueous solution to a point upstream from the introduction of the persulfate.

In accordance with certain embodiments, the concentration of recalcitrant organic contaminant in the second treated aqueous solution may be at least 99% less than the initial concentration of contaminant. The recalcitrant organic contaminant may be 1,4-dioxane. The concentration of the recalcitrant organic contaminant in the second treated aqueous solution may be 1 ppb or less.

In some embodiments, the second treated aqueous solution may be potable water. In some embodiments, the method may comprise extracting the contaminated groundwater from a remediation site.

The recalcitrant organic contaminant may be selected from 1,4-dioxane, trichloroethylene (TCE), perchloroethylene (PCE), urea, isopropanol, chloroform, atrazine, tryptophan, and formic acid.

The method may further comprise measuring a total organic carbon (TOC) value of the contaminated groundwater to be treated. The method may further comprise adjusting at least one of a rate at which the persulfate is introduced to the contaminated groundwater and a dose of the irradiation based on the measured TOC value.

In some embodiments, the irradiation may be produced by an ultraviolet lamp. The method may comprise cleaning the ultraviolet lamp.

In accordance with another aspect, there is provided a method of treating contaminated groundwater having an initial concentration of a recalcitrant organic contaminant. The method may comprise extracting the contaminated groundwater from a feed stream. The method may comprise preparing an aqueous persulfate solution with high purity water. The method may comprise introducing the aqueous persulfate solution to the extracted groundwater to produce a first treated aqueous solution. The method may comprise exposing the first treated aqueous solution to irradiation to produce a second treated aqueous solution. The second treated aqueous solution may have a concentration of the recalcitrant organic contaminant that is at least 50% less than the initial concentration of recalcitrant organic contaminant.

In some embodiments, the aqueous persulfate solution may be prepared with deionized water or reverse osmosis permeate.

The method may comprise pretreating the extracted groundwater to remove iron before introducing the aqueous persulfate solution. In some embodiments, pretreating the extracted groundwater comprises at least one of oxidizing the extracted groundwater and filtering the extracted groundwater with a media filter. In some embodiments, a concentration of iron in the pretreated groundwater may be 0.1 mg/L or less.

The recalcitrant organic contaminant may be selected from 1,4-dioxane, trichloroethylene (TCE), perchloroethylene (PCE), urea, isopropanol, chloroform, atrazine, tryptophan, and formic acid. In some embodiments, the recalcitrant organic contaminant may be 1,4-dioxane. The concentration of the recalcitrant organic contaminant in the second treated aqueous solution may be 5 ppb or less.

The method may further comprise measuring a total organic carbon (TOC) value of the contaminated groundwater to be treated. In some embodiments, the method may further comprise adjusting at least one of a rate at which the persulfate is introduced to the contaminated groundwater and a dose of the irradiation based on the measured TOC value.

In some embodiments, the irradiation may be produced by an ultraviolet lamp. The method may comprise cleaning the ultraviolet lamp.

In accordance with yet another aspect, there is provided a system for treating contaminated groundwater. The system may comprise a pretreatment subsystem capable of removing iron from an aqueous solution. The system may comprise a source of persulfate fluidly connectable to a source of contaminated groundwater having an initial concentration of a recalcitrant organic contaminant. The source of persulfate may be fluidly connected downstream from the pretreatment subsystem. The source of persulfate may be configured to introduce the persulfate to the contaminated groundwater and produce a first treated aqueous solution. The system may comprise an irradiation source fluidly connected downstream from the source of persulfate. The irradiation source may be configured to irradiate the contaminated groundwater and produce a second treated aqueous solution having a concentration of the recalcitrant organic contaminant lower than the initial concentration of the recalcitrant organic contaminant.

In some embodiments, the pretreatment subsystem may be fluidly connectable downstream from the source of contaminated groundwater. The pretreatment subsystem may be configured to remove iron from the contaminated groundwater. The pretreatment subsystem may comprise a media filter. The media filter may comprise filtration media selected from manganese dioxide, manganese oxide, and silica. The pretreatment subsystem may comprise a source of an oxidant. The source of the oxidant may comprise chlorine, permanganate, or an oxygen containing gas.

The pretreatment subsystem may comprise a water purification unit. The pretreatment subsystem may be configured to produce high purity water for the source of persulfate. The water purification unit may comprise an ion exchange unit or a reverse osmosis unit.

The system may further comprise a TOC concentration sensor fluidly connected to the contaminated groundwater. The system may further comprise a controller operably connected to the TOC concentration sensor. The controller may be configured to control at least one of a rate at which the persulfate is introduced to the contaminated groundwater and a dose of irradiation applied by the irradiation source based on an output signal from the TOC concentration sensor.

The system may be a mobile-based platform.

In some embodiments, the system may comprise a pump configured to extract the contaminated groundwater from the source of contaminated groundwater. The source of contaminated groundwater may be a remediation site.

The irradiation source may be configured to produce the second treated aqueous solution having a concentration of the recalcitrant organic contaminant that is at least 50% less than the initial concentration of recalcitrant organic contaminant. The irradiation source may be configured to produce the second treated aqueous solution having a concentration of the recalcitrant organic contaminant that is at least 99% less than the initial concentration of recalcitrant organic contaminant. The recalcitrant organic contaminant may be 1,4-dioxane and the irradiation source may be configured to produce the second treated aqueous solution having a concentration of the recalcitrant organic contaminant of 1 ppb or less.

In accordance with certain embodiments, the system may further comprise a recirculation line extending between a point downstream from the irradiation source and a point upstream from the source of persulfate. In some embodiments, the point upstream from the source of persulfate may be upstream from the pretreatment subsystem.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1A:
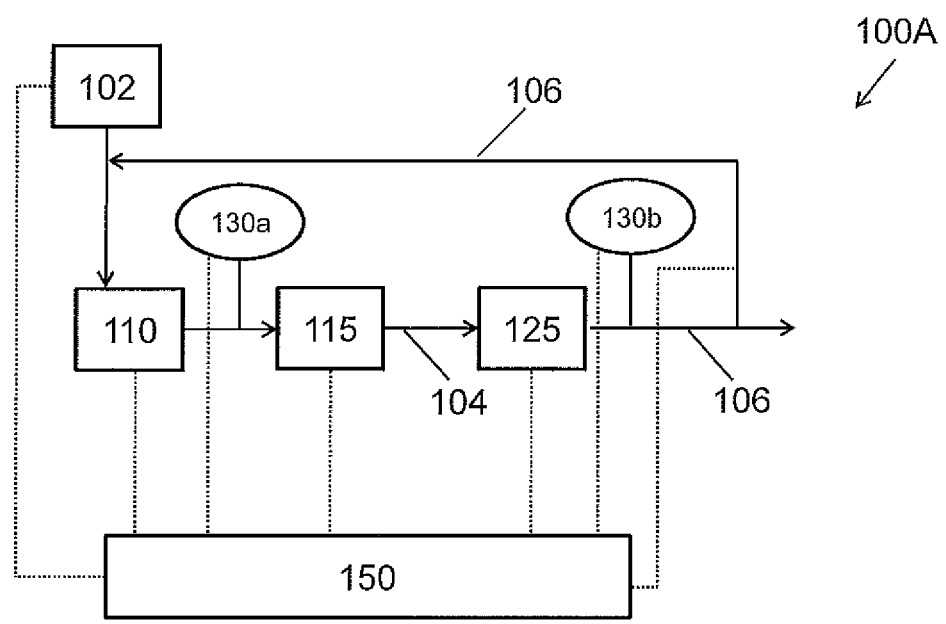
FIG. 1A is a schematic drawing illustrating a system in accordance with one or more embodiments.

Pressure to clean up contaminated sites has continued under government regulation which requires removal, reduction, destruction, or stabilization of environmentally hazardous chemical compounds. However, certain groundwater contaminants are difficult to treat in a cost-effective manner. These contaminants gain a reputation as being "recalcitrant" primarily as a result of fundamental physicochemical properties that make treatment difficult.

Biodegradation (one potential method for remediating such contamination) involves using indigenous or introduced (i.e., non-indigenous) bacteria or other microbes to degrade or digest organic chemicals transported across their cell membranes, thereby producing byproducts such as carbon dioxide gas and water. Although biodegradation works well for certain organic contaminants, it can be difficult or impossible to biodegrade recalcitrant organic contaminants.

1,4-dioxane is one example of a recalcitrant organic contaminant. 1,4-Dioxane, otherwise referred to as simply "dioxane," is a clear liquid that easily dissolves in water. It is used primarily as a solvent in the manufacture of chemicals and as a laboratory reagent and has various other uses that take advantage of its solvent properties. 1,4-Dioxane is a trace contaminant of some chemicals used in cosmetics, detergents, and shampoos. However, manufacturers now reduce 1,4-dioxane from these chemicals to low levels before these chemicals are made into products used in the home.

In accordance with one or more non-limiting embodiments, 1,4-dioxane concentrations in contaminated water may be less than about 1.0 mg/l. Some states may have established maximum concentration limit guidelines, such as levels of less than about 0.30 µg/l in drinking water.

The Environmental Protection Agency (EPA) identifies the most serious hazardous waste sites in the nation. These sites are then placed on the National Priorities List (NPL) and are targeted for long-term federal clean-up activities. 1,4-Dioxane has been found in at least 31 of the 1,689 current or former NPL sites. Although the total number of NPL sites evaluated for this substance is not known, the possibility exists that the number of sites at which 1,4-dioxane is found may increase in the future as more sites are evaluated. Since 1,4-dioxane is considered a hazardous material that contaminates ground water, there is a need for a process that will remove 1,4-dioxane from groundwater. Previously, attempts have been made to use a combination of hydrogen peroxide and ultraviolet light (UV), or ozone in combination with UV light to destroy 1,4-dioxane. These processes are not very efficient and may require an additional post treatment step with peroxide to completely remove 1,4-dioxane. Another process used is a regenerable charred resin material that will adsorb 1,4-dioxane. However, this process results in a waste stream that contains concentrated 1,4-dioxane that requires another means to destroy the 1,4-dioxane such as incineration.

One or more aspects relate to a method of treating contaminated groundwater. According to some embodiments, the method comprises providing a contaminated groundwater having an initial concentration of a recalcitrant organic contaminant to be treated, introducing a persulfate to the contaminated groundwater to produce a first treated aqueous solution, and exposing the first treated aqueous solution to ultraviolet light to produce a second treated aqueous solution, where the second treated aqueous solution has a concentration of the recalcitrant organic contaminant that is at least 50% less than the initial concentration of recalcitrant organic contaminant.

According to certain aspects, the method can further comprise measuring a total organic carbon (TOC) value of the contaminated groundwater to be treated. The method may further comprise adjusting at least one of a rate at which the persulfate is introduced to the contaminated groundwater and a dose of the ultraviolet light based on the measured TOC value. According to a further aspect, adjusting a dose of the ultraviolet light comprises at least one of adjusting an intensity of the UV light and adjusting an exposure time of the UV light to the first treated aqueous solution. According to another aspect, adjusting an exposure time of the UV light comprises adjusting a flow rate of the first treated aqueous solution. According to yet another aspect, adjusting an exposure time of the UV light comprises adjusting a residence time of the first treated aqueous solution in a reactor.

According to at least one aspect, the method can further comprise measuring a TOC value of the second treated aqueous solution. According to at least one aspect, the method further comprises recirculating at least a portion of the second treated aqueous solution to a point upstream from the introduction of the persulfate based on the measured TOC value of the second treated aqueous solution. According to some aspects, the method further comprises adjusting at least one of a rate at which the persulfate is introduced to the contaminated groundwater and a dose of the ultraviolet light based on the measured TOC value of the second treated aqueous solution.

In accordance with various aspects, the first treated aqueous solution is a first treated stream and the second treated aqueous solution is a second treated stream and the persulfate is introduced to the contaminated groundwater upstream from the exposure of the first treated stream to the ultraviolet light. According to one aspect, the concentration of recalcitrant organic contaminant in the second treated aqueous solution is at least 99% less than the initial concentration of contaminant.

According to at least one aspect, the method can further comprise pretreating the contaminated groundwater. According to a further aspect, pretreating the contaminated groundwater comprises introducing the contaminated groundwater to a media filter prior to introducing the persulfate.

In accordance with certain aspects, the contaminated groundwater is introduced to the persulfate and exposed to the first treated aqueous solution in a single pass.

According to at least one aspect, the second treated aqueous solution is potable water. According to another aspect, the method may further comprise extracting the contaminated groundwater from a remediation site.

One or more aspects relate to a system for treating contaminated groundwater. In some embodiments, the system comprises a source of contaminated groundwater having an initial concentration of a recalcitrant organic contaminant, a TOC concentration sensor in fluid communication with the contaminated groundwater, a source of persulfate fluidly connected to the source of contaminated groundwater and configured to introduce a persulfate to the contaminated groundwater, an actinic radiation source fluidly connected to the source of contaminated groundwater and configured to irradiate the contaminated groundwater, and a controller in communication with the TOC concentration sensor and configured to control at least one of a rate at which the persulfate is introduced to the contaminated groundwater and a dose of irradiation applied by the actinic radiation source based on an output signal from the TOC concentration sensor.

According to certain aspects, the system further comprises a reactor fluidly connected to the source of contaminated groundwater and the source of persulfate and configured to house the actinic radiation source. According to another aspect, the controller is configured to control the dose of irradiation by controlling a residence time of the contaminated groundwater in the reactor. According to yet another aspect, the controller is configured to control the dose of irradiation by controlling a flow rate of the contaminated groundwater. According to a further aspect, the actinic radiation source is positioned downstream from the source of persulfate. According to at least one aspect, the TOC concentration sensor is positioned upstream from the source of persulfate. According to another aspect, the TOC concentration sensor is a first TOC concentration sensor and the system further comprises a second TOC concentration sensor in communication with the controller and positioned downstream from the actinic radiation source. According to certain aspects, the controller is configured to control at least one of the rate at which the persulfate is introduced to the contaminated groundwater, and a dose of irradiation applied by the actinic radiation source based on an output signal from the second TOC concentration sensor.

In accordance with some aspects, the system further comprises a valve fluidly connected to a treated water exiting the actinic radiation source, and the controller is configured to control the valve based on the output signal from the second TOC concentration sensor. According to another aspect, the system further comprises a media filter positioned upstream from the source of persulfate.

According to at least one aspect, the system is a mobile-based platform.

In accordance with one or more aspects, ex-situ methods and systems for groundwater remediation are disclosed.

One or more aspects can be directed to groundwater treatment systems and techniques. The systems and techniques may utilize the use of a persulfate in combination with a source of ultraviolet (UV) light to treat groundwater contaminated with a recalcitrant organic contaminant. According to some embodiments, the groundwater is treated such that the concentration of recalcitrant organic contaminant is reduced to levels such that the groundwater may be returned to the source, i. e., the level of recalcitrant organic contaminant falls below one or more standards set by governing authorities. According to a further aspect, the concentration of recalcitrant organic contaminant is reduced such that the treated groundwater may be characterized as potable water. For example, according to some embodiments, the methods and systems disclosed herein may treat contaminated groundwater to produce potable water. The potable water may comply with standards set by municipalities. As used herein the term "recalcitrant organic" when used in reference to a contaminant refers to organic compounds that resist microbial degradation or are not readily biodegradable. In certain instances, the recalcitrant organic contaminant may not degrade biologically, and remediation methods may be unable to remove enough of the substance to satisfy environmental regulations. Non-limiting examples of recalcitrant organic contaminants include 1,4-dioxane, trichloroethylene (TCE), perchloroethylene (PCE), urea, isopropanol, chloroform, atrazine, tryptophan, and formic acid. Tables 1A-1D below list non-limiting examples of recalcitrant organic contaminants that may be present in groundwater treated by the systems and techniques disclosed herein.

Tables 1A and 1B below lists various types of organic contaminants and examples that may be treated by the systems and methods disclosed herein.

TABLE 1A

| Anions (not oxidized, but decomposed) |
| --- |
| Chlorate |
| Bromate |
| Halogenated Alkanes |
| |
| 1,2,3-trichloropropane (1,2,3-TCP) |
| 1,1-dichloroethane |
| 1,2-dichloroethane |
| Trihalomethanes (Trichloromethane, Monochlorodibromomethane, etc.) |
| Bromomethane |
| Chloromethane |
| Halogenated Alkenes |
| |
| Tetrachloroethene |
| Trichloroethene |
| 1,2-cis-dichloroethene |
| 1,2-trans-dichloroethene |
| Vinyl Chloride |
| Alkynes |
| |
| Acetylene |
| Dichloroethylene |
| TCE Trichloroethylene |
| PCE Tetrachloroethylene |
| Halogentated Organic Acids |
| |
| Haloacetic Acids (Trichloro aceticacid, monochloroaceticacid, monochlorodibromoacetic acid, iodoacetic acids, etc.) |
| Amines |
| |
| Methylamine |
| Ethanolamine |
| Diphenylamine |
| Aniline |
| Piperidine |
| Methylethanolamine |
| Trimethylamine |
| Nitrosamines |
| NDMA, N-Nitrosodimethylamine |
| Surfactants/Algacides/Bactericides |
| |
| Quaternary ammonium alkyl halides |
| Alcohols |
| |
| Methanol |
| Ethanol |
| Isopropanol |
| Butanol |
| Pentanol |
| Hexanol |
| TBA (Tert Butyl Alcohol) |
| Acetic Acids |
| |
| Monochloroacetic Acid |
| Dichloroacetic Acid |
| Iodoacetic Acid |
| PTFE Precursors |
| |
| PFOA |
| PFOS |
| PFNA |
| Ethers/Aldehydes |
| |
| 1,4-dioxane |
| Formaldehyde |
| Diethyl ether |
| Polyethylene glycol |
| MTBE (Methyl Tertbutyl Ether) |
| Ketones |
| |
| 2-pentanone (MPK) |
| butanone (MEK) |
| Organisms |
| |
| Bacteria |
| Molds |

TABLE 1A-continued

Fungi
Viruses (including entero & noro)

TABLE 1B

Pharmaceuticals and Personal
Care Products

Acetaminophen
Androstenedione
Atrazine
Benzo[a]pyrene
Caffeine
Carbamazepine
DDT
DEET
Diazepam
Diclofenac
Dilantin
Erythromycin
Estradiol
Estriol
Estrone
Ethinylestradiol
Fluorene
Fluoxetine
Galaxolide
Gemfibrozil
Hydrocodone
Ibuprofen
Iopromide
Lindane
Meprobamate
Metolachlor
Musk Ketone
Naproxen
Oxybenzone
Pentoxifylline
Progesterone
Sulfamethoxazole
TCEP
Testosterone
Triclosan
Trimethoprim
Unreacted Monomers Acrylonitrile
Vinyl chloride
Propylene
Styrene
Urethane
Cyclic siloxanes Hexamethylcyclotrisiloxane
Decamethylcyclopentasiloxane
Linear siloxanes Octamethyltrisiloxane
Dodecamethylpentasiloxane
Ammonia
Sulfur Bearing Compounds Hydrogen Sulfide
Dimethyl Disulfide
Dimethyl Sulfide
Carbonyl Sulfide
Polyaromatic Hydrocarbons Naphthalene
Fluorene
Anthracene
Aromatic Hydrocarbons Benzene
Cumene
Xylene
Phenol

TABLE 1B-continued

Benzoate
Benzylamine
Benzylacetate
Halogenated Aromatics

Benzyl chloride
Benzyl bromide
Chlorophenol

Table 1C lists additional examples of various recalcitrant organic contaminants and their respective class that may be treated by the methods and systems disclosed herein. One or more of these compounds may be endocrine disruptors. Endocrine disruptors may refer to an exogenous chemical substance which inhibits or promotes various processes such as the homeostasis of the living body, and synthesis, storage, secretion, internal transport, receptor binding, hormone activity and excretion of various internal hormones involved in reproduction, development and behavior, and is also a term which may also be named an exogenous endocrine disrupting substance, an endocrine disrupting substance, an endocrine disrupting chemical substance, an endocrine disorder substance, or an environmental hormone.

TABLE 1C

| Contaminant | Class |
|---|---|
| Acetaminophen | Pharmaceutical |
| Androstenedione | Steroid |
| Atrazine | Pesticide |
| Benzo[a]pyrene | PAH (polycyclic aromatic hydrocarbon) |
| Caffeine | PCP (personal care product) |
| Carbamazepine | Pharmaceutical |
| DDT | Pesticide |
| DEET | PCP |
| Diazepam | Pharmaceutical |
| Diclofenac | Pharmaceutical |
| Dilantin | Pharmaceutical |
| Erthromycin-H20 | Antimicrobial |
| Estadiol | Steroid |
| Estriol | Steroid |
| Estrone | Steroid |
| Ethinylestradiol | Steroid |
| Fluorene | PAH |
| Fluoxetine | Pharmaceutical |
| Galaxolide | Fragrance |
| Gemfibrozil | Pharmaceutical |
| Hydrocodone | Pharmaceutical |
| Ibuprofen | Pharmaceutical |
| Iopromide | Pharmaceutical |
| Lindane | Pesticide |
| Meprobamate | Pharmaceutical |
| Metolachlor | Pesticide |
| Musk Ketone | Fragrance |
| Naproxen | Pharmaceutical |
| Oxybenzone | PCP |
| Pentoxifylline | Pharmaceutical |
| Progesterone | Steroid |
| Sulfamethoxazole | Antimicrobial |
| TCEP | PCP |
| Testosterone | Steroid |
| Triclosan | Antimicrobial |
| Trimethoprim | Antimicrobial |

Table 1D includes non-limiting examples of pharmaceutical and personal care product compounds that may be treated by the systems and methods disclosed here. One or more of these substances may also be endocrine disruptors.

TABLE 1D

| Pharmaceuticals | |
| --- | --- |
| Trimethoprim, crytomycine, lincomycin, sultamethaxole, chloramphenicol, amoxycillin | Veterinary & human antibiotics |
| Ibuprofen, diclofenac, fenoprofen, acetaminophen, naproxen, acetylsalicyclic acid, fluoxetine, ketoprofen, indometacine, paracetamol | Analgesics & anti-inflammatory drugs |
| Diazepam, carbamazepine, primidone, salbutamol | Psychiatric drugs |
| Clofibric acid, bezafibrate, fenofibric acid, etofibrate, gemfibrozil | Lipid regulators |
| Metoprolol, propranolol, timolol, sotalol, atenolol | B-Blockers |
| Iopromide, iopamidol, diatrizoate | X-ray contrasts |
| Estradiol, estrone, estriol, diethylstilbestrol (DES) | Steroids & hormones |
| Nitro, polycyclic and macrocyclic musks, phthalates | Personal care products and Fragrances |
| Benzophenone, methylbenzylidene camphor | Sun-screen agents |
| N,N-diethyltoluamide | Insect repellants |
| Triclosan, chlorophene | Antiseptics |

In accordance with at least one aspect, some embodiments involve a method for treating contaminated groundwater. As used herein, the term "groundwater" may refer to water recoverable from subterranean sources as well as water recovered from surface bodies of water, such as streams, ponds, marshes, and other similar bodies of water. The groundwater may be contaminated with a recalcitrant organic contaminant, as discussed above. The groundwater may have become contaminated from any one of a number of different sources, such as industrial processes, agricultural process, such as pesticide and herbicide applications, or other processes, such as disinfection processes that produce undesirable byproducts such as trihalomethanes.

In accordance with at least one embodiment, the methods and systems disclosed herein may include providing a contaminated groundwater having an initial concentration of a recalcitrant organic contaminant. According to some embodiments, the methods and systems disclosed herein may include extracting or otherwise removing the contaminated groundwater. For instance, the contaminated groundwater may be pumped from the ground or other sources using one or more pumps or other extraction devices as part of a remediation effort. Once treated, the groundwater may then be returned to the source or sent on for further processing. According to some embodiments, the contaminated groundwater is pumped or otherwise removed to the surface grade level where it may then be treated according to the processes and methods discussed herein. For example, according to some embodiments, the methods and systems disclosed herein may include extracting the contaminated groundwater from a remediation site. In at least one embodiment, one or more extraction wells and extraction equipment, such as pumps, may be used for pumping contaminated groundwater to the surface to be treated. Once treated, a pump or other distribution system may be used to return the treated groundwater to the source or otherwise re-introduce the treated groundwater back into the environment. In certain instances the contaminated groundwater may be stored in a holding tank or vessel prior to treatment, and in some cases treated water produced by the processes disclosed herein may be added or otherwise mixed with the contaminated groundwater.

In accordance with one or more aspects, the contaminated groundwater may have a level of total dissolved solids (TDS) that is in a range of about 100 mg/L to about 5000 mg/L, and in some instances may be in a range of about 200 mg/L to about 2000 mg/L, although these values can vary depending on the geographic location and other factors. As a source of comparison, water with a TDS level of 1000-1500 mg/L is considered drinkable, with some standards having a 500 mg/L TDS limit for domestic water supplies.

In accordance with another aspect, the methods and systems disclosed herein may be connected or otherwise in fluid communication with a source of contaminated groundwater. For instance, the contaminated groundwater may be pumped or otherwise delivered to the disclosed system for treatment.

According to various aspects, the concentration of recalcitrant organic contaminant in the groundwater is high enough to exceed limits established by government agencies. According to some embodiments, the systems and methods disclosed herein treat the groundwater such that the concentration level of the recalcitrant organic contaminant is reduced. In some instances, the systems and methods disclosed herein reduce the concentration of the recalcitrant organic contaminant to a level that complies with government standards or guidelines. According to one embodiment, the concentration of recalcitrant organic contaminant is reduced to a level such that the treated groundwater may be returned to the source. For example, the EPA's standard for the concentration of 1,4-dioxane in drinking water is 1 µg/L (1 ppb). The methods and systems disclosed herein may be scaled to treat substantially all concentrations of recalcitrant organic contaminant that may be present in the groundwater. For instance, according to some embodiments, the initial concentration of recalcitrant organic contaminant, such as dioxane, in the groundwater may be in a range from about 5 ppb to about 800 ppb.

In accordance with at least one aspect, a persulfate may be introduced to the contaminated groundwater. As used herein, the term "persulfate" is used in reference to a composition that when combined with an aqueous solution contributes at least one of the peroxomonosulfate (or peroxymonosulfate) ion $SO_5^{-2}$ and the peroxodisulfate (or peroxydisulfate) ion $S_2O_8^{-2}$. Non-limiting examples of persulfates include alkali and alkali metal persulfates such as sodium persulfate, potassium persulfate, and any other Group I metal persulfate, and ammonium persulfate or ammonium persulfate, peroxydisulfate salts such as alkali and alkali metal peroxydisulfate and ammonium peroxydisulfate, acids such as peroxydisulfuric acid, peroxymonosulfuric acid or Caro's acid, as well as combinations thereof. According to certain aspects, the persulfate may be stored in a tank or other vessel and introduced to the contaminated groundwater through a controllable valve or other controllable conduit such that the rate of persulfate introduced to the contaminated groundwater may be controlled.

In accordance with another aspect, the contaminated groundwater may be exposed to a source of ultraviolet (UV) light. For instance, the systems and methods disclosed herein may include the use of one or more UV lamps, each emitting light at a desired wavelength in the UV range of the electromagnetic spectrum. For instance, according to some embodiments, the UV lamp may have a wavelength ranging from about 180 to about 280 nm, and in some embodiments, may have a wavelength ranging from about 185 nm to about 254 nm.

According to some embodiments, a source of persulfate may first be introduced to the contaminated groundwater, which may be followed by exposure of the contaminated groundwater to UV light. According to other embodiments, the persulfate addition and the UV exposure may occur at approximately the same time, i. e., simultaneously or nearly simultaneously. According to various aspects, the persulfate and the UV light function to oxidize the recalcitrant organic contaminant into non-hazardous compounds, including carbon dioxide and water. For example, persulfate and UV may react with recalcitrant organic contaminants as shown below by Equation 1:

Equation 1A

In accordance with certain aspects, the chemical reaction of persulfate with UV may be expressed as shown below by Equation 2:

Equation 2

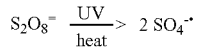

Further, the free sulfate radicals formed when the persulfate is activated by UV react with the organic contaminants by removing electrons from the organic molecule to produce organic radials, as shown below in Equation 2A for the carboxylate ion:

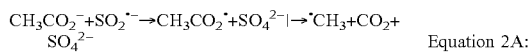

Equation 2A:

The sulfate radical reacts with aromatic or heterocyclic contaminants via an electron transfer mechanism to produce a radical cation, as shown below by Equation 2B:

Equation 2B

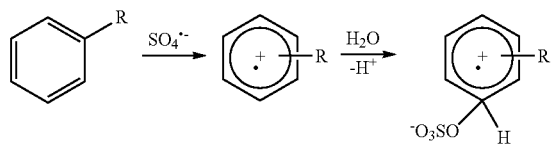

Without being bound by theory, it is believed that the free sulfate radicals are responsible for the oxidation of TOC, either directly, or by reacting with other radicals and oxidants.

According to various aspects, the combination of persulfate with UV light is more effective than using either component on its own. For instance, in the examples discussed below, the combination of persulfate with UV light was shown to decrease the total organic carbon (TOC) concentration by nearly 100% for many contaminants, whereas UV light alone reduced the TOC concentration to a lesser degree. For example, the TOC concentration for urea was only reduced 9% by UV light alone, but was reduced by 100% when persulfate was used in combination with UV light. Similarly, the initial TOC concentration for 1,4-dioxiane was reduced by nearly 100% when persulfate was used in combination with UV, whereas UV alone only reduced this amount by about 72%.

According to various embodiments, the treatment of the contaminated groundwater with the persulfate and the UV light may reduce the initial concentration of recalcitrant organic contaminant in the groundwater by at least 50%. In some embodiments, the treatment with persulfate and UV light may reduce the initial concentration of recalcitrant organic contaminant by at least 70%, in some embodiments by at least 90%, by at least 99%, and in some embodiments, the treatment may result in 100% removal, or to levels that are not detectable. According to at least one embodiment, substantially all of the recalcitrant organic contaminant may be removed from the contaminated groundwater, meaning that 99-100% is removed.

In accordance with at least one aspect, one or more embodiments may involve a method of treating water. The method can comprise providing a contaminated groundwater having an initial concentration of recalcitrant organic contaminant to be treated. The method also comprises introducing a persulfate to the contaminated groundwater to produce a first treated aqueous solution. The method also comprises exposing the first treated aqueous solution to ultraviolet light to produce a second treated aqueous solution. In some embodiments, the second treated aqueous solution has a concentration of recalcitrant organic contaminant that is at least 50% less than the initial concentration of recalcitrant organic contaminant. The method may also comprise measuring a total organic carbon (TOC) value of the contaminated groundwater to be treated, and adjusting at least one of a rate at which the persulfate is introduced to the contaminated groundwater and a dose of the ultraviolet light based on the measured TOC value. In some embodiments, adjusting the rate at which the persulfate is introduced to the contaminated groundwater may include adjusting a flow rate of persulfate. According to other embodiments, adjusting the rate at which the persulfate is introduced may include adjusting the concentration of the persulfate. For instance, the concentration of persulfate may be increased or decreased, depending on one or more measured TOC readings. According to at least one embodiment, a TOC value of the second treated aqueous solution may be measured. A portion of the second treated aqueous solution may be recirculated to a point upstream from the introduction of persulfate based on the measured TOC value of the second treated aqueous solution. In some instances, a portion of the second treated aqueous solution may be recirculated based on the measurement of one or both the TOC value of the contaminated groundwater and the TOC value of the second treated aqueous solution. For instance, in some embodiments, the treatment by the persulfate and the UV may reduce the concentration of the recalcitrant organic contaminant to a desired or otherwise predetermined level in a single pass. According to at least one aspect, the second treated aqueous solution is potable water. According to other embodiments, at least a portion of the contaminated groundwater may be exposed to the persulfate and the UV in multiple passes for purposes of reducing the concentration of the recalcitrant organic contaminant to an acceptable level. The second treated aqueous solution may be recirculated for other reasons as well, such as to dilute the concentration of contaminants in the groundwater in instances where the groundwater is stored or otherwise held in a container or vessel prior to treatment.

According to some embodiments, adjusting a dose of the ultraviolet light may comprise at least one of adjusting an intensity of the UV light and adjusting an exposure time of the UV light to the first treated aqueous solution. For instance, the first treated aqueous solution may be held or otherwise contained within a reactor or vessel and be exposed to UV light for a predetermined exposure time while the solution is housed within the reactor or vessel.

According to some embodiments, baffles or other flow control devices positioned within the reactor or vessel may also contribute to containing the first treated aqueous solution for a predetermined exposure time. According to other embodiments, adjusting a dose of the ultraviolet light may comprise adjusting a flow rate of the first treated aqueous solution. For instance, the first treated aqueous solution may pass through a conduit that is configured to allow UV light to pass through to the conduit to irradiate the first treated aqueous solution. According to other embodiments, the dose of the UV light may be adjusted by adjusting a power setting of the UV light, or by adjusting the wavelength of the UV lamp.

According to some embodiments, at least one of the intensity of the UV light and the dose of UV light may be adjusted based on one or more operating parameters, such as a TOC value. UV dose, when applied to a persulfate, is a measure of the total lamp electrical energy applied to a fixed volume of water. The units are usually measured in kWh/1000 gallons. This parameter combines flowrate, residence time, and light intensity into a single term. The dose may vary from one type of contaminated water to the other. However, the dosage may be set to destroy virtually all types of contaminants to any level required. The calculation for either batch or flowthrough treatment is shown below by Equations 3 and 4, respectively:

Batch:

$$\text{UV Dose} = (\text{lamp power (kW)} \times \text{time (hrs)} \times 1000) / (\text{batch volume (gal.)}) \quad \text{Equation 3:}$$

Flowthrough:

$$\text{UV Dose} = \text{lamp power (kW)} \times 1000 / (\text{flow (gpm)} \times 60) \quad \text{Equation 4:}$$

According to at least one embodiment, a controller, as discussed further below, may be used to control the UV dose for batch and flowthrough processes, including the lamp power, the exposure time, the and the flow rate.

According to at least one embodiment, the contaminated groundwater may be pretreated. For instance, the contaminated groundwater may be pretreated prior to the introduction of persulfate. Pretreatment may function to remove any one or more undesirable components from the contaminated groundwater, such as substances that may interfere with the processes and systems disclosed herein. For example, pretreatment may involve a water disinfectant process, a sediment removal process, or the removal of any other undesired component, such as a water deionization process. In accordance with at least one embodiment, pretreatment may be performed using a media filter, as described further below. According to other embodiments, pretreatment may be performed by adding or otherwise exposing the contaminated groundwater to one or more pretreatment substances. For instance, chlorine may be added as a disinfectant to the contaminated groundwater.

In accordance with at least one embodiment, the methods and systems disclosed herein include a media filter. The media filter may function to remove any one or more undesirable components from the contaminated groundwater, such as dissolved solids or particulates which may interfere with the function of the UV light or clog components of the filtration system.

The media filter may be any one of a number of different types of media filters, including a particulate filter, such as a screen filter, sand filter, a bag filter, or a filter cartridge, and may contain one or more types of media, such as, activated carbon or other carbons, nut shells, sand, resins, and other types of adsorbents. For example, the media filter may function to remove particulates or otherwise reduce the turbidity of the contaminated groundwater.

A level of total dissolved solids (TDS) in the contaminated groundwater may be reduced. According to some embodiments, ion exchange resin may be used. Ion exchange softening may be implemented as a hardness removal pretreatment process. The ion exchange resin may function to reduce the hardness of the contaminated groundwater. For example, in certain instances a mixed bed deionizer may be used in the systems and methods disclosed herein. A mixed bed deionizer uses both cation and anion regenerative ion exchange resin beads, which are mixed together to remove impurities. The mixed bed deionizer allows water to make repeated contact with the cation and anion beads, and remove or reduce the concentration of undesirable ions in the contaminated groundwater through the process of ion exchange.

Other non-limiting examples of pretreatment devices include reverse osmosis devices, electrodialysis devices, electrodeionization devices, and distillation devices. The pretreatment device may also be placed at one or more locations in the process where a device with a particular functionality may be desired. For instance, an additional media filter may be positioned in the recirculating loop of the second treated aqueous solution.

Methods disclosed herein may incorporate the removal of iron from one or more process streams. Conventionally, iron is used as an activating oxidant in groundwater treatment. However, the presence of iron in the contaminated groundwater may have an adverse effect with persulfate. Iron compounds typically react with persulfate to prematurely activate and then deactivate the persulfate. The efficacy of the persulfate treatment may be reduced when the persulfate is deactivated before being introduced into the contaminated groundwater and before irradiation with ultraviolet light. To mitigate the reduced efficacy, iron may be removed upstream from dosing the groundwater with persulfate. In certain embodiments, iron may be removed from a water stream used to make up the persulfate solution.

In accordance with one or more embodiments, pretreatment for iron removal may prevent decline in UV lamp intensity readings as iron fouling of the quartz sleeves may be prevented. In turn, dioxane removal may be enhanced. Conventionally, frequent chemical cleaning may be required. In at least some embodiments, an effective iron removal process upstream may extend the time in service between chemical cleaning by one or two orders of magnitude.

A pretreatment operation may be performed to remove iron from the contaminated groundwater stream. The pretreatment may produce a pretreated groundwater having a concentration of iron less than a concentration sufficient to deactivate the persulfate. The pretreatment operation may be designed to correspond with a concentration of persulfate introduced into the contaminated groundwater. For instance, in some embodiments, the groundwater may be pretreated to have a concentration of iron less than a concentration sufficient to deactivate 50% of the persulfate. The groundwater may be pretreated to have a concentration of iron less than a concentration sufficient to deactivate 30%, 20%, 10%, 5%, or 1% of the persulfate. In some non-limiting embodiments, groundwater may contain less than about 10 mg/l of iron. Even low concentrations of iron, for example, about 0.5 mg/l or less, can be associated with adverse conditions including water discoloration.

The pretreatment may produce a pretreated groundwater having substantially no iron. In some embodiments, the pretreatment may produce a pretreated groundwater having a concentration of iron of 0.5 mg/L or less. For instance, the pretreated groundwater may have a concentration of iron of 0.4 mg/L or less, 0.3 mg/L or less, 0.2 m/L or less, 0.1 mg/L or less, or 0.05 mg/L or less.

Iron in the contaminated groundwater may be removed by treatment with a filtration media. The filtration media may be selected for removal of iron. For instance, the filtration media may comprise at least one of manganese dioxide, manganese oxide, and silica. The filtration media may be a catalytic filtration media. In an exemplary embodiment, the filtration media may comprise manganese oxide. Such a filtration media may remove iron by oxidizing iron upon contact and capturing the oxidized iron. Commercially available filtration media include, for example, manganese greens and (distributed by Nelson Co., Norton, Ohio), birm (distributed by Clack Corporation, Windsor, Wis.), and DMI-65 (distributed by Quantum Filtration Medium, Collie, Wash., Australia). The pretreatment may further comprise adjusting a pH of the contaminated groundwater to be compatible with iron removal by the selected filtration media.

Iron in the contaminated groundwater may be removed by oxidation. An oxidizing agent may be introduced into the contaminated groundwater to precipitate the iron. The precipitated iron may then be removed by a filtration operation, for example, a gravity filtration or pressurized filtration. The oxidant may be selected from chlorine, permanganate, oxygen, ozone, and peroxide. In some embodiments, the contaminated groundwater may be dosed with chlorine. The chlorine may be introduced at a rate of between about 1 and 2 parts chlorine per one part iron. The contaminated groundwater may be dosed with oxygen. The oxygen may be introduced at a rate of between about 0.1 and 0.2 parts dissolved oxygen per one part iron. In some embodiments, the oxygen may be introduced by aerated. Aeration may be achieved, for example, with an aeration pump. The pretreatment may further comprise adjusting a pH of the contaminated groundwater to be compatible with iron oxidation by the selected oxidant.

In some embodiments, iron may be removed from a stream of water used to make up the persulfate solution. The iron may be removed by any of the methods previously described herein. Additionally, the persulfate solution may be made up with high purity water. For example, the persulfate solution may be made up with deionized water or reverse osmosis permeate. Thus, methods may comprise treating a stream with ion exchange or reverse osmosis to produce the persulfate solution makeup water. The water used to makeup the persulfate solution may be substantially free of iron. In some embodiments, the water used to make up the persulfate solution may have less than 0.2 mg/L of iron. The water used to makeup the persulfate solution may have an iron concentration of less than 0.1 mg/L, less than 0.05 mg/L, less than 0.025 mg/L, or less than 0.01 mg/L.

Additionally, removal of iron upstream from the source of ultraviolet light may reduce a rate of fouling of the UV quartz sleeve(s). Typically, quartz sleeves are subject to a periodic cleaning operation which may include wiping the quartz sleeve to remove foulants, including iron. An example of a conventional cleaning agent may be citric acid. The systems and methods disclosed herein may facilitate maintenance of the treatment system, for example, by reducing the number of required maintenance operations or allowing the treatment system to operate for a longer period of time between quartz sleeve cleaning processes.

Methods disclosed herein may comprise cleaning the UV quartz sleeves. Iron may be removed to prevent build-up on the sleeves that house UV lamps. Such build-up may decrease the amount of UV light available to activate the persulfate, thus decreasing the removal of contaminants. In some embodiments, a wiper may be used to clean the quartz sleeves. Wipers may address organics, metals and particulates. A wiping operation may be manual or automatic. In some embodiments involving automatic wiping, system operation may run substantially continuously. Pretreatment to remove iron as disclosed herein may improve the operating time as the sleeves should not be fouled. Chemical cleaning may therefore not be required. Periodic chemical cleaning, such as with citric acid, may be implemented but at a reduced frequency compared to conventional operation or may not be necessary at all. Wipers may add expense but may be used in conjunction with pretreatment as disclosed herein to address iron. In some embodiments, pretreatment alone and no wipers and/or chemical cleaning may be implemented.

In some embodiments, pretreatment of the contaminated groundwater may increase operating time of the system between quartz sleeve maintenance operations by at least about 50%. In some embodiments, pretreatment of the contaminated groundwater may increase operating time of the system between quartz sleeve maintenance operations by at least about 100%, for example, by at least about 150%, by at least about 200%, by at least about 300%, or by at least about 400%. Methods disclosed herein may comprise measuring a concentration of iron in the contaminated groundwater. The method may comprise adjusting a rate at which the persulfate is introduced based on the measured concentration of iron. For example, the persulfate may be introduced at a rate at which at most about 30%, 20%, 10%, 5%, or 1% of the persulfate will be deactivated by the concentration of iron in the contaminated groundwater. The method may comprise adjusting the pretreatment of the contaminated groundwater. For example, the method may comprise adjusting a rate at which the oxidant is introduced into the contaminated groundwater, as previously described herein. The method may additionally or alternatively comprise adjusting a rate at which the contaminated water is filtered by the media filter, as previously described herein. The filtration rate may be adjusted, for example, by varying flowrate of the contaminated groundwater through the filtration media.

The methods disclosed herein may produce treated water having a concentration of a recalcitrant organic contaminant that is less than the contaminated groundwater. In some embodiments, the concentration of recalcitrant organic contaminant in the treated water may be 10 ppb or less. The concentration of recalcitrant organic contaminant in the treated water may be 5 ppb or less, 4 ppb or less, 3 ppb or less, 2 ppb or less, 1 ppb or less, or 0.5 ppb or less. One or more recalcitrant organic contaminants may exist together in the contaminated groundwater.

In accordance with at least one aspect, some embodiments thereof can involve a system for treating contaminated groundwater. The system may comprise a source of contaminated groundwater having an initial concentration of recalcitrant organic contaminant and a TOC concentration sensor in fluid communication with the contaminated groundwater. The system may also include a source of persulfate fluidly connected to the source of contaminated groundwater. The source of persulfate may be configured to introduce a persulfate to the contaminated groundwater. The system may also comprise an actinic radiation source that is fluidly connected to the source of contaminated groundwater. The actinic radiation source may be configured to irradiate the contaminated groundwater. The system may also include a controller that is in communication with the TOC concentration sensor and is configured to control at least one of a rate at which the persulfate is introduced to the contaminated groundwater and a dose of irradiation applied by the actinic radiation source based on an output signal from the TOC concentration sensor.

FIG. 1A schematically embodies a system 100A in accordance with one or more aspects. System 100A can be representative of a water treatment system that removes recalcitrant organic contaminants from contaminated groundwater. According to some embodiments, system 100A may be a water treatment system that reduces a concentration, content, or level of one or more impurities or contaminants that may be present in contaminated groundwater. In at least one embodiment, groundwater that has been treated by system 100A may be reintroduced to the environment. According to other embodiments, groundwater that has been treated by system 100A may be further processed in downstream processing operations. According to various aspects, system 100A is representative of a system that includes a sequential treatment method, whereby persulfate is introduced to the contaminated groundwater prior to exposure to UV light, and may include a series of conduits where the contaminated groundwater is transported from one treatment operation to the next. In contrast, FIG. 1B exemplifies a system 100B whereby a reactor 145 is used combine one or more treatment operations, such as the persulfate and UV, and is discussed further below.

As exemplarily illustrated, system 100A may comprise a source of contaminated groundwater 102 that has an initial concentration of recalcitrant organic contaminant, a media filter 110, a source of persulfate 115, a source of UV light 125, one or more sensors 130a and 130b, which in some embodiments may be TOC concentration sensors, and a controller 150.

According to some embodiments, the contaminated groundwater 102 may be pretreated by passing it through the media filter 110 to remove any one or more undesired species, such as particulates or ionic species. The media filter 110 may be provided and characterized as previously discussed. Although not shown, other pretreatment devices may also be used to pretreat the contaminated groundwater 102, besides the media filter 110, such as pretreatment devices that disinfect the contaminated groundwater 102. According to some embodiments, the treatment system may not include a media filter and may include some other type of pretreatment device, and in certain instances, no pretreatment device is used to pretreat the contaminated groundwater.

A source of persulfate 115 may be introduced to the contaminated groundwater 102 to produce a first treated aqueous stream 104. The source of persulfate 115, may be any one or more persulfate species as described above, and may be introduced to the source of groundwater in a number of different ways. For example, the source of persulfate may be dispensed through a valve through a conduit that is connected to a conduit containing the contaminated groundwater. As discussed further below, the source of persulfate 115 may be controlled by the controller 150. According to some embodiments, the introduction of persulfate 115 may be adjusted and controlled based on characteristics or measured or calculated parameters of the system, such as measured parameters of the inlet contaminated groundwater or treated water, such as water that has been treated by the persulfate and UV. Non-limiting examples of these measured parameters include TOC concentration, temperature, and flow rate. For instance, the rate at which the persulfate 115 is introduced to the contaminated groundwater or the concentration level of the persulfate 115 that is introduced to the contaminated groundwater may be controlled by the controller 150 based on a measured TOC value of water taken by sensor 130a. The control of the rate at which persulfate 115 is introduced may be accomplished through the use of one or more flow control devices, such as a valve or pump. The source of persulfate may be stored locally in a tank or vessel and pumped through one or more pumps, valves, and conduits to be introduced to the contaminated groundwater. The persulfate 115 may be introduced at a certain concentration level to the contaminated groundwater. For instance, according to some embodiments, the persulfate 115 may be added at a concentration level in a range from about 1 ppb to about 1000 ppb per ppb TOC (i. e., the initial concentration that may be measured by sensor 130a), and in some embodiments, the persulfate may be added at a concentration level in a range from about 1 ppb to about 500 ppb per ppb TOC. In other embodiments persulfate may be added at a concentration level in a range from about 1 ppb to about 200 ppb. As will be understood, the concentration level of persulfate may be dependent on a number of different factors, including the type of application, the type of contaminant, and/or the concentration of contaminant in the groundwater. For instance, the concentration level of persulfate may be a function of various design parameters, including residence time, reactor dimensions, UV lamp characteristics, TOC composition and concentration, as well as other factors including capital and operating costs, as well as the available footprint.

The first treated aqueous stream 104 treated by the persulfate 115 may be exposed to a source of ultraviolet light 125 to produce a second treated aqueous solution 106. According to some embodiments, the source of ultraviolet light 125 may be characterized as an actinic radiation source, otherwise referred to herein as an actinic radiation reactor. The actinic radiation reactor can comprise a vessel that includes one or more arrays of tubes. According to some embodiments, the actinic radiation reactor may comprise a first array of tubes in the vessel. The first array of tubes can comprise a first set of parallel tubes, and a second set of parallel tubes. Each tube can comprise at least one ultraviolet lamp and each of the parallel tubes of the first set is positioned to have its longitudinal axis orthogonal relative to the longitudinal axis of the tubes of the second set. According to some embodiments, one or more tubes are arranged in parallel to the longitudinal axis of the reactor. For instance, the first treated aqueous stream 104 may pass through an actinic radiation reactor that comprises one or more parallel tubes that are positioned parallel to the longitudinal axis of the reactor. The first treated aqueous stream 104 may enter one end of the reactor and flow along the longitudinal axis to the other end of the reactor, and thereby be exposed to UV light, i. e., a path oriented configuration. According to other embodiments, a cross flow configuration is used. As discussed further below, ultraviolet lamps may be positioned within quartz sleeves or tubes that protect the lamp from fluids. In addition, the reactor may be constructed from corrosion-resistant material such as stainless steel.

Commercially available sources of actinic radiation systems include those from, for example, Quantrol, Naperville, Ill., as the AQUAFINE® UV system, and from Aquionics Incorporated, Erlanger, Ky.

In certain embodiments, the ultraviolet lamps can be operated at one or more illumination intensity levels. For example, one or more lamps can be used that can be adjusted to operate at a plurality of illumination modes, such as at any of dim, rated, and boost mode, for example, a low, medium, or high mode. The illumination intensity of one or more lamps can be adjusted and controlled based on characteristics or measured or calculated parameters of the system, such as measured parameters of the inlet contaminated groundwater or treated water, such as water that has been treated by the persulfate and UV. Non-limiting examples of these measured parameters include TOC concentration, temperature, and flow rate. The illumination intensity of one or more lamps can also be adjusted and controlled based on the concentration or amount of persulfate added to the system. For example, the one or more lamps can be used in a dim mode up to a predetermined threshold value of a measured parameter of the system, such as a first TOC concentration. The one or more lamps can be adjusted to rated mode if the measured or calculated TOC concentration reaches or is above a second TOC concentration, which may be above the threshold value. The one or more lamps can further be adjusted to a boost mode if the measured or calculated TOC concentration reaches or is above a second threshold value.

The controller 150 may be in communication with one or more sensors or input devices that are configured to provide an indication or representation of at least one property, characteristic, state or condition of at least one of a process stream, a component, or a subsystem of treatment system 100A. For example, controller 150 may be operatively coupled or otherwise configured to receive input signals from any one or more sensors 130a and 130b. The controller 150 may also be operatively coupled to receive input signals from the contaminated groundwater 102 or any other water stream in the system. The input signals can also be representative of any property of the water, and may provide an indication of the resistivity or conductivity, the flow rate, the TOC value, the temperature, the pressure, concentration values of a particular compound or species, the amount of bacteria, the dissolved oxygen content, and/or the dissolved nitrogen content. Although only sensors 130a and 130b are particularly depicted, additional sensors may be utilized, for example, one or more temperature, conductivity, or resistivity sensors in system 100A. For instance, an additional sensor may be positioned to measure one or more properties of the first treated aqueous stream 104, such as the persulfate concentration.

Controller 150 can be configured to receive any one or more input signals and generate one or more drive, output, and control signals to any one or more components of the system 100A. As illustrated, the controller 150 may, for example, receive an indication of a flow rate, a TOC level, or both, of the contaminated groundwater 102, the second treated aqueous solution 106, or from another position within the system. The controller 150 may generate and transmit a drive signal or otherwise control any of the media filter 110, source of persulfate 115, source of UV light 125, and the second treated aqueous stream 106 in response to the input signals. For instance, the controller 150 may generate and transmit a drive signal to the source of persulfate 115 to, if necessary, adjust the rate of addition of persulfate introduced into the contaminated groundwater 102. The drive signal may be based on one or more input signals and a target or predetermined value or set-point. For instance, if the input signal that provides a representation of the TOC value of the contaminated groundwater 102 or second treated aqueous stream 106 is above a target TOC value or a range of acceptable TOC values, i. e., a tolerance range, then the drive signal can be generated to increase an amount or a rate of addition of the persulfate 115 and/or a dose of UV light from UV source 125. The target value may be application specific and may vary from installation to installation and be dependent on standards established by local or federal governments or downstream processing or use requirements.

In some embodiments, the controller 150 may, for example, receive an indication of a flow rate and/or a TOC concentration or level and generate and transmit a drive signal to the source of persulfate 115 and/or the source of UV 125, such as the lamps of the UV source 125 to adjust or modify at least one of the one or more lamps in operation and the intensity of the lamps. The drive signal can be based on the one or more input signals and a target or predetermined value or set-point, or threshold value. For example, if the input signal that provides a representation of the TOC value of the contaminated groundwater 102 or second treated aqueous stream 106 is above the target TOC value or threshold value, or a range of acceptable TOC values, i. e., a tolerance range, then the drive signal can be generated to adjust the rate of persulfate 115 introduced to the contaminated groundwater 102 and/or dose administered by the UV source 125, such as by adjusting at least one of the lamp configuration and the lamp intensity. In some embodiments, the controller 150 may also receive an indication of a persulfate amount or rate of addition, and generate and transmit a drive signal to the source of persulfate 115 and/or the UV source 125 in response to the input signal associated with the persulfate amount, such as the persulfate concentration in one or more of the water streams of the system. According to some embodiments, the controller 150 may generate and transmit control signals to, for example, energize or adjust an intensity or power of output radiation emitted by UV source 125. Thus, depending on the amount or rate of addition of persulfate 115 and/or the level of TOC in the contaminated groundwater 102, the control signal may be increased or decreased appropriately, incrementally, or proportionally.

The controller 150 may be configured in a feedback arrangement and generate and transmit one or more control signals to any one of the source of persulfate 115 and the UV source 125. For instance, the TOC value or the resistivity, or both, of the second treated aqueous solution 106 may be utilized to generate control signals to any of contaminated groundwater 102, the source of persulfate 115, and the UV source 125.

During periods of high initial TOC fluctuations, a feedforward control may be utilized to compensate for instrument delay. This technique may allow the addition of persulfate 115 at a surplus value relative to the amount of contaminants. During periods of stable TOC levels, the feedback approach may be utilized with or without the feedforward control.

Figure 8:
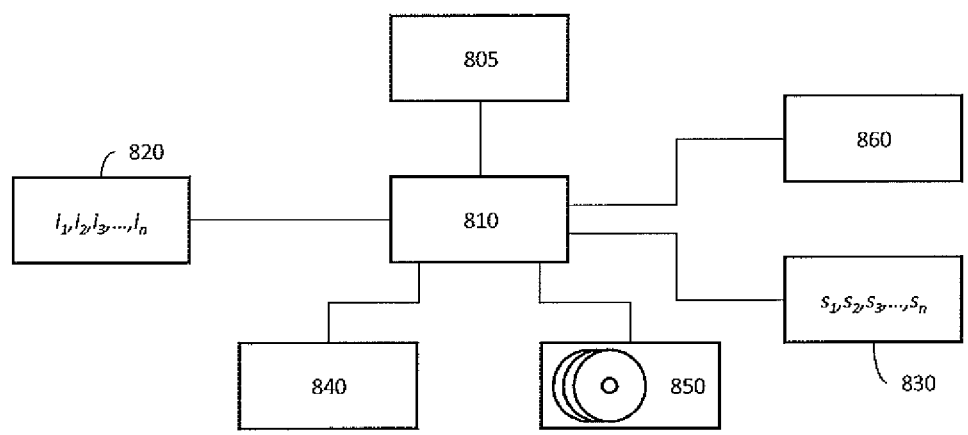
FIG. 8 is a schematic drawing illustrating a processor or controller upon which one or more embodiments may be practiced.

Controller 150 may be implemented using one or more processors as schematically represented in FIG. 8. Controller 150 may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the control system may include specially-programmed, special-purpose hardware, for example, an application-specific integrated circuit (ASIC) or controllers intended for analytical systems.

Controller 150 may include one or more processors 805 typically connected to one or more memory devices 850, which can comprise, for example, any one or more of a disk drive memory, a flash memory device, a RAM memory device, or other device for storing data. Memory device 850 is typically used for storing programs and data during operation of the systems 100A and 100B and/or controller 150. For example, memory device 850 may be used for storing historical data relating to the parameters over a period of time, as well as operating data. Software, including programming code that implements embodiments, can be stored on a computer readable and/or writeable nonvolatile recording medium, and then typically copied into memory device 850 wherein it can then be executed by processor 805. Such programming code may be written in any of a plurality of programming languages, for example, Java, Visual Basic, C, C #, or C++, Fortran, Pascal, Eiffel, Basic, COBAL, or any of a variety of combinations thereof.

Components of controller 150 may be coupled by an interconnection mechanism 810, which may include one or more busses, e. g., between components that are integrated within a same device, and/or a network, e. g., between components that reside on separate discrete devices. The interconnection mechanism typically enables communications, e. g., data, instructions, to be exchanged between components of the system.

Controller 150 may also include one or more input devices 820 receiving one or more input signals $i_1$, $i_2$, $i_3$, . . . , $i_n$, from, for example, a keyboard, mouse, trackball, microphone, touch screen, and one or more output devices 830, generating and transmitting, one or more output, drive or control signals, $s_1$, $s_2$, $s_3$, . . . , $s_n$, to for example, a printing device, display screen, or speaker. In addition, controller 150 may contain one or more interfaces 860 that can connect controller 150 to a communication network (not shown) in addition or as an alternative to the network that may be formed by one or more of the components of the system.

According to one or more embodiments, the one or more input devices 820 may include components, such as but not limited to, valves, pumps, and sensors 130a and 130b that typically provide a measure, indication, or representation of one or more conditions, parameters, or characteristics of one or more components or process streams of systems 100A and 100B. Alternatively, the sensors, the metering valves and/or pumps, or all of these components may be connected to a communication network that is operatively coupled to the controller 150. For example, sensors 130a and 130b may be configured as input devices that are directly connected to the controller 150, metering valves and/or pumps of associated with the source of persulfate 115 or positioned anywhere else in the system may be configured as output devices that are connected to the controller 150, and any one or more of the above may be coupled to a computer system or an automated system, so as to communicate with the controller 150 over a communication network. Such a configuration permits one sensor to be located at a significant distance from another sensor or allow any sensor to be located at a significant distance from any subsystem and/or the controller, while still providing data therebetween.

The controller 150 may comprise one or more storage media such as a computer-readable and/or writeable nonvolatile recording medium in which signals can be stored that define a program or portions thereof to be executed by, for example, one or more processors 805. The one or more storage media may, for example, be or comprise a disk drive or flash memory. In typical operation, processor 805 can cause data, such as code that implements one or more embodiments, to be read from the one or more storage media into, for example, memory device 840 that allows for faster access to the information by the one or more processors than does the one or more media. Memory device 840 is typically a volatile, random access memory such as a dynamic random access memory (DRAM) or static memory (SRAM) or other suitable devices that facilitates information transfer to and from processor 805.

Although the controller 150 is shown by way of example as one type of computer system upon which various aspects may be practiced, it should be appreciated that the embodiments are not limited to being implemented in software, or on the computer system as exemplarily shown. Indeed, rather than being implemented on, for example, a general purpose computer system, the control system, or components or subsystems thereof, may be implemented as a dedicated system or as a dedicated programmable logic controller (PLC) or in a distributed control system. Further, it should be appreciated that one or more features or aspects may be implemented in software, hardware or firmware, or any combination thereof. For example, one or more segments of an algorithm executable by processor 805 can be performed in separate computers, each of which can be in communication through one or more networks.

Although not explicitly shown, system 100A may also include an in-line mixer that functions to mix the contaminated groundwater 102 with the source of persulfate 115 prior to being exposed to the source of UV light 125. This may ensure even distribution of the persulfate species throughout the contaminated groundwater 102 and allow for a more efficient process when UV light is applied.

Figure 1B:
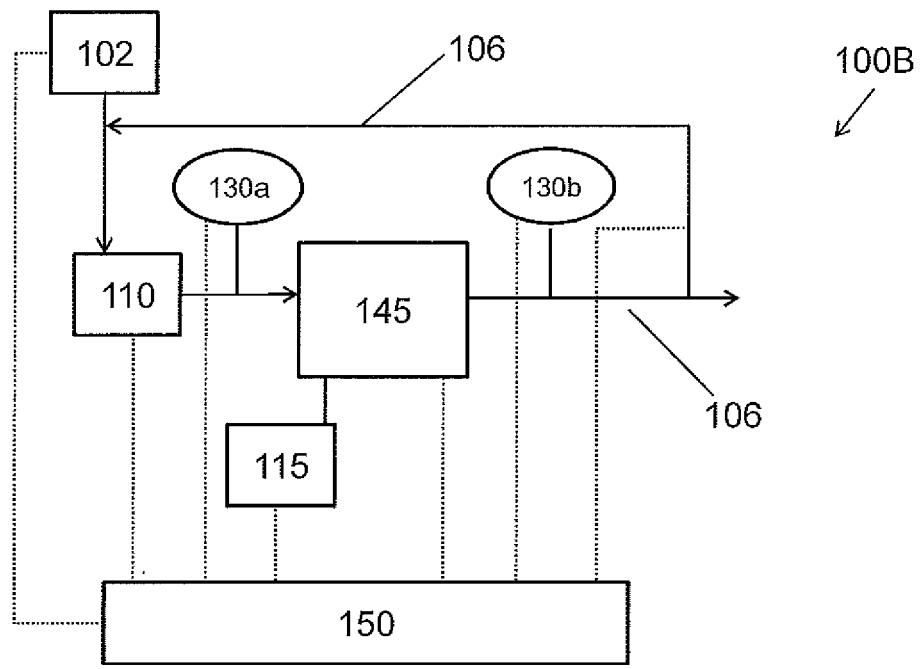
FIG. 1B is a schematic drawing illustrating a system in accordance with one or more embodiments.

FIG. 1B schematically embodies a system 100B in accordance with one or more aspects. Like System 100A, System 100B can be representative of a water treatment system that removes recalcitrant organic contaminants from contaminated groundwater. As such, system 100B may be a water treatment system that reduces a concentration, content, or level of one or more impurities or contaminants that may be present in contaminated groundwater, and according to at least one embodiment, groundwater that has been treated by system 100B may be reintroduced to the environment. According to other embodiments, groundwater that has been treated by system 100B may be further processed in downstream processing operations. According to various aspects, system 100B is representative of a system that includes a batch treatment method, whereby persulfate 115 is introduced to a reactor 145 that contains the contaminated groundwater 102 and the reactor 145 houses or otherwise includes a source of UV light. The reactor 145 allows for the option of sequential treatment, i. e., the introduction of persulfate 115 followed by UV exposure, a simultaneous treatment, i. e., persulfate and UV light exposure are done at the same time, is also possible using the reactor 145.

As exemplarily illustrated, system 100B is similar to system 100B and may comprise a source of contaminated groundwater 102 that has an initial concentration of recalcitrant organic contaminant, a media filter 110, a source of persulfate 115, one or more sensors 130a and 130b, which in some embodiments may be TOC concentration sensors, and a controller 150, as previously described and discussed. However, system 100B includes the reactor 145 where one or more treatment operations may occur. According to some embodiments, the reactor 145 may be configured as an irradiation reactor that is fluidly connected to the contaminated groundwater 102. For example, the reactor 145 may be house or otherwise include an actinic radiation source and may be configured as an actinic radiation reactor as discussed above.

One or more lamps can be utilized in the reactor 145 to illuminate or irradiate the fluid contained therein. Particular embodiments can involve one or more reactors having a plurality of lamps, each advantageously disposed or positioned therein to irradiate the water with one or more illumination intensity levels for one or a plurality of illumination periods. Further aspects can involve utilizing the one or more lamps within any of the reactors in configurations that accommodate or facilitate a plurality of simultaneous illumination intensities.

The ultraviolet lamps can be advantageously positioned or distributed within the one or more reactors of the system to irradiate or otherwise provide actinic radiation to the water as desired. In certain embodiments, it is desired to distribute the lamps within the one or more reactors to evenly distribute actinic radiation throughout the reactor. In any of systems 100A and 100B, the ultraviolet lamps can be adjusted to provide illumination at various intensities or various power levels. For example, ultraviolet lamps can be used that can be adjusted to operate at a plurality of illumination modes, such as dim, rated, and boost mode, for example, a low, medium, or high mode.

The one or more lamps can be positioned within the one or more actinic radiation reactors by being placed within one or more sleeves or tubes within the reactor. The tubes can hold the lamps in place and protect the lamps from the water within the reactor. The tubes can be made of any material that is not substantially degraded by the actinic radiation and the water or components of the water within the reactor, while allowing the radiation to pass through the material. The tubes can have a cross-sectional area that is circular. In certain embodiments, the tubes can be cylindrical, and the material of construction thereof can be quartz. Each of the tubes can be the same or different shape or size as one or more other tubes. The tubes can be arranged within the reactor in various configurations, for example, the sleeves may extend across a portion of or the entire length or width of the reactor. The tubes can also extend across an inner volume of the reactor.

Commercially available ultraviolet lamps and/or quartz sleeves may be obtained from Hanovia Specialty Lighting, Fairfield, N.J., Engineered Treatment Systems, LLC (ETS), Beaver Dam, Wis., and Heraeus Noblelight GmbH of Hanau, Germany. The quartz material selected can be based at least in part on the particular wavelength or wavelengths that will be used in the process. The quartz material may be selected to minimize the energy requirements of the ultraviolet lamps at one or more wavelengths. The composition of the quartz can be selected to provide a desired or suitable transmittance of ultraviolet light to the water in the reactor and/or to maintain a desired or adequate level of transmissivity of ultraviolet light to the water. In certain embodiments, the transmissivity can be at least about 50% for a predetermined period of time. For example, the transmissivity can be about 80% or greater for a predetermined period of time. In certain embodiments, the transmissivity can be in a range of about 80% to 90% for about 6 months to about one year. In certain embodiments, the transmissivity can be in a range of about 80% to 90% for up to about two years.

The tubes can be sealed at each end so as to not allow the contents of the reactor from entering the sleeves or tubes. The tubes can be secured within the reactor so that they remain in place throughout the use of the reactor. In certain embodiments, the tubes are secured to the wall of the reactor. The tubes can be secured to the wall through use of a suitable mechanical technique, or other conventional techniques for securing objects to one another. The materials used in the securing of the tubes is preferably inert and will not interfere with the operation of the reactor or negatively impact the purity of the water, or release contaminants to the water. The lamps can be arranged within the reactor such that they are parallel to each other. The lamps can also be arranged within the reactor at various angles to one another. For example, in certain embodiments, the lamps can be arranged to illuminate paths or coverage regions that form an angle of approximately 90 degrees such that they are approximately orthogonal or perpendicular to one another. The lamps can be arranged in this fashion, such that they form an approximately 90 degree angle on a vertical axis or a horizontal axis, or any axis therebetween.

In certain embodiments, the reactor can comprise an array of tubes in the reactor or vessel comprising a first set of parallel tubes and a second set of parallel tubes. Each tube may comprise at least one ultraviolet lamp and each of the parallel tubes of the first set can be arranged to be at a desired angle relative to the second set of parallel tubes. The angle may be approximately 90 degrees in certain embodiments. The tubes of any one or both of the first array and the second array may extend across an inner volume of the reactor. The tubes of the first set and the second set can be arranged at approximately the same elevation within the reactor.

Further configurations can involve tubes and/or lamps that are disposed to provide a uniform level of intensity at respective occupied or coverage regions in the reactor. Further configurations can involve equispacially arranged tubes with one or more lamps therein.

The reactor may contain one or more arrays of tubes arranged within the reactor or vessel. A second array of tubes can comprise a third set of parallel tubes, and a fourth set of parallel tubes orthogonal to the third set of parallel tubes, each tube comprising at least one ultraviolet lamp. The fourth set of parallel tubes can also be orthogonal to at least one of the second set of parallel tubes and the first set of parallel tubes.

In certain embodiments, each array within the reactor or vessel can be positioned a predetermined distance or elevation from another array within the reactor. The predetermined distance between a set of two arrays can be the same or different.

Figure 9:
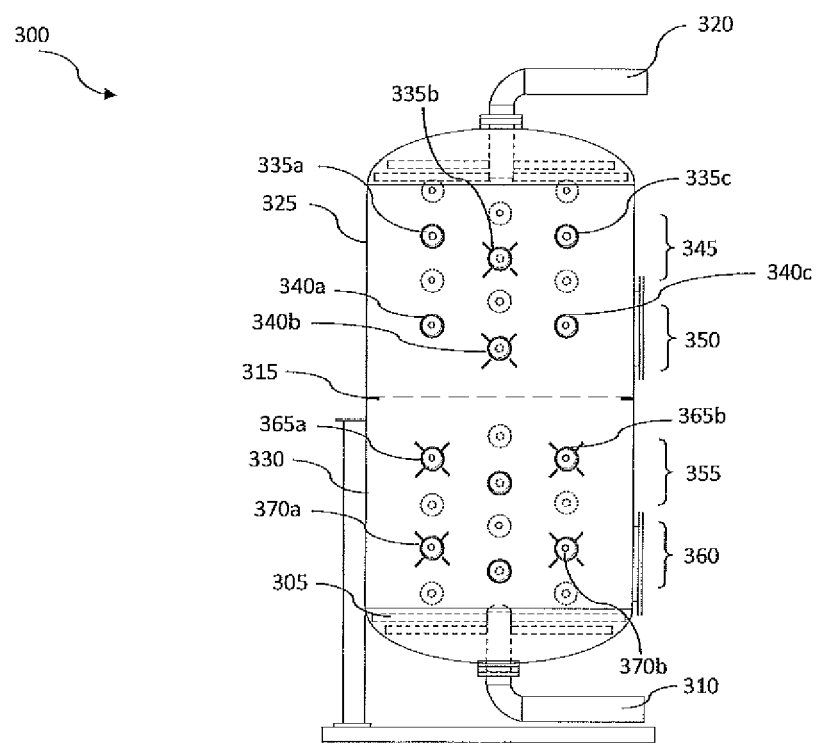
FIG. 9 is a schematic drawing illustrating a reactor in accordance with one or more embodiments.

FIG. 9 exemplarily shows a cross-sectional view of a reactor vessel 300 that can be used in system 100B. Reactor vessel 300 typically comprises inlet 310, outlet 320, and baffle 315 which divides reactor vessel 300 into upper chamber 325 and lower chamber 330. Reactor vessel 300 can also comprise manifold 305 which can be configured to distribute water introduced through inlet 310 throughout the vessel. In certain embodiments, manifold 305 can be configured to evenly distribute water throughout the vessel. For example, manifold 305 can be configured to evenly distribute water throughout the vessel such that the reactor operates as a plug flow reactor.

In some embodiments, the reactor vessel may comprise more than one baffle 315 to divide the reactor vessel into more than two chambers. Baffle 315 can be used to provide mixing or turbulence to the reactor. In certain embodiments, as shown in FIG. 9, reactor inlet 310 is in fluid communication with lower chamber 330 and reactor outlet 320 is in fluid communication with upper chamber 325.

In some embodiments, at least three reactor chambers, each having at least one ultraviolet (UV) lamp disposed to irradiate the water in the respective chambers with light of about or ranging from about 185 nm to about 254 nm, 220 nm, and/or 254 nm at a desired or at various power levels, are serially arranged in reactor 120.

The reactor vessel can also comprise a plurality of ultraviolet lamps positioned within tubes, for example tubes 335a-c and 340a-c. In one embodiment, as shown in FIG. 9, reactor vessel 300 comprises a first set of parallel tubes, tubes 335a-c and a second set of parallel tubes (not shown). Each set of parallel tubes of the first set is approximately orthogonal to the second set to form first array 345. Tubes 335a-c and the second set of parallel tubes are at approximately the same elevation in reactor vessel 300, relative to one another.

Figures 10A, 10B:
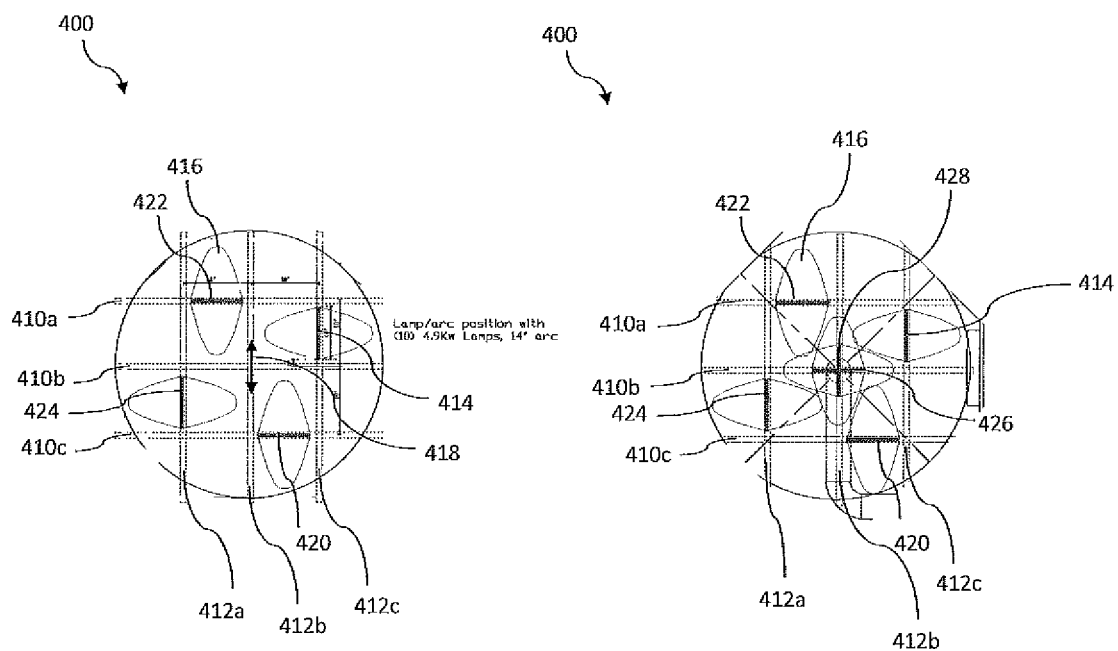
FIG. 10A is a schematic drawing illustrating a reactor in accordance with one or more embodiments.
FIG. 10B is a schematic drawing illustrating a reactor in accordance with one or more embodiments.

Further, the reactor vessel can comprise a third set of parallel tubes and a fourth set of parallel tubes. Each set of parallel tubes of the first set is approximately orthogonal to the second set to form, for example, second array 350. As exemplarily illustrated, tubes 340a-c and the second set of parallel tubes are at approximately the same elevation in reactor vessel 300, relative to one another. As shown in FIG. 9, first array 345 can be positioned at a predetermined distance from second array 350. Vessel 300 can additionally comprise third array 355 and fourth array 360, each optionally having similar configurations as first array 340 and second array 345. In another embodiment, a first tube 335b can be arranged orthogonal to a second tube 340b to form a first array. Additionally, a set of tubes, tube 365a and tube 365b can be arranged orthogonal to another set of tubes, tube 370a and tube 370b to form a second array. The position of the lamps of the second array are shown in FIG. 10A, including lamps 414, 420, 422, and 424. The positions of the lamps in the first array and the second array are shown in FIG. 10B, including lamps 426 and 428 of the first array and lamps 414, 420, 422, and 424 of the second array.

The lamps can generate a pattern, depending on various properties of the lamp, including the dimensions, intensity, and power delivered to the lamp. The light pattern generated by the lamp is the general volume of space to which that the lamp emits light. In certain embodiments the light pattern or illumination volume is defined as the area or volume of space that the lamp can irradiate or otherwise provide actinic radiation and allow for oxidation of the recalcitrant organic contaminant.

As shown in FIGS. 10A and 10B, which shows exemplarily cross-sectional views of reactor 400 in which a first set of tubes 410a-c are arranged parallel to one another, and a second set of tubes 412a-c are arranged parallel to one another. As shown, first set of tubes 410a-c is arranged orthogonal relative to second set of tubes 412a-c. Lamps, such as lamps 414, are dispersed within tubes 410a-c and 412a-c, and when illuminated, can generate light pattern 416. One or more ultraviolet lamps, or a set of lamps, can be characterized as projecting actinic radiation parallel an illumination vector. The illumination vector can be defined as a direction in which one or more lamps emits actinic radiation. In an exemplarily embodiment, as shown in FIG. 10A, a first set of lamps, including lamp 420 and 422, is disposed to project actinic radiation parallel to illumination vector 418.

A first set of ultraviolet lamps each of which is disposed to project actinic radiation parallel a first illumination vector can be energized. A second set of ultraviolet lamps each of which is disposed to project actinic radiation parallel a second illumination vector can also be energized. At least one of the direction of the illumination and the intensity of at least one of the first set of ultraviolet lamps and second set of ultraviolet lamps can be adjusted. Each set of ultraviolet lamps can comprise one or more ultraviolet lamps.

The number of lamps utilized or energized and the configuration of the lamps in use can be selected based on the particular operating conditions or requirements of the system. For example, the number of lamps utilized for a particular process can be selected and controlled based on characteristics or measured or calculated parameters of the system. For example measured parameters of the inlet water or treated water can include any one or more of TOC concentration, temperature, and flow rate. The number of energized lamps can also be selected and controlled based on the concentration or amount of persulfate added to the system. For example, 12 lamps in a particular configuration can be used if the flow rate of the water to be treated is at or below a certain threshold value, for example a nominal or design flow rate, such as 1300 gpm, while more lamps can be used if the flow rate of the water to be treated rises above the threshold value. For example, if the flow rate increases from 1300 gpm to a selected higher threshold value, additional lamps can be energized. For example, 24 lamps may be used if the flow rate of the water to be treated reaches 1900 gpm. Thus the flow rate of the water can be partially determinative of which lamps and/or the number of energized lamps in each reactor.

Contaminated groundwater 102 may thus enter the reactor 145, where it comes into contact with a source of persulfate 115 and is exposed to the source of actinic radiation. This treated water exits the reactor 145 as the second treated aqueous solution 106. Thus, the first treated aqueous solution 104 generated by the source of persulfate 115 in system 100A is present in the reactor 145 of system 100B.

Reactor 145 may be a plug flow reactor or a continuously stirred tank reactor, or combinations thereof. In certain embodiments, a plug flow reactor can be used to prevent the likelihood of blinded or regions of lower irradiation intensity, such as short circuiting, of illumination by the lamps within the reactor. A plug flow reactor can be defined as a reactor that operates under conditions that facilitate laminar flow paths of fluid through the reactor, having parallel, non-turbulent flow paths. Reactor 145 may be sized to provide a residence time sufficient to allow the persulfate and actinic radiation source degrade or otherwise convert the recalcitrant organic contaminants into one or more inert compounds.

The reactor 145 may additionally be sized based on the expected flow rate of the system to provide a sufficient or a desired residence time in the reactor. In certain embodiments, the flow rate of water through the system can be based on the demand for treated water downstream of the system, or the flow rate of water being utilized upstream of the system, or both. In certain examples, the flow rate of water through the system, or through each reactor, can be between about 1 gallon per minute (gpm) and 3200 gpm. As will be appreciated, the flow rate will depend on a variety of factors, including the application, the size of the system, and the type of contaminant being treated. The flow rate may also depend on other factors included in the system, such as the temperature of a reactor housing the source of UV light. For instance, the flow rate may be increased so as to not have the reactor overheat. Further, the reactor and other unit operations and equipment of the system, such as pumps and flow valves, can be selected and sized to allow for fluctuations or changes in flow rates.

The reactor 145 may include a single chamber or may be divided into one or more chambers by one or more baffles between the chambers. The baffle can be used to provide mixing or turbulence to the reactor or prevent mixing or promote laminar, parallel flow paths through the interior of the reactor, such as in the one or more chambers. In certain instances, a reactor inlet may be in fluid communication with a first chamber and a reactor outlet may be in fluid communication with a second chamber.

According to at least one embodiment, the reactor 145 includes a single chamber having at least one UV lamp disposed to irradiate the contaminated groundwater with light of 185 nm, 220 nm, or 254 nm, or ranging from about 185 nm to about 254 nm. According to other embodiments, the reactor 145 is divided into multiple chambers. For example, according to some embodiments, at least three reactor chambers are serially arranged in reactor 145, each having at least one ultraviolet (UV) lamp disposed to irradiate the water in the respective chambers with light of about 185 nm, 220 nm, and/or 254 nm, or ranging from about 185 nm to about 254 nm, at various power levels. According to other embodiments, sets of serially arranged reactors may be arranged in parallel. For example, a first set of reactors in series may be placed in parallel with a second set of reactors in series, with each set having three reactors, for a total of six reactors. Any one or more of the reactors in each set may be in service at any time. In certain embodiments, all reactors may be in service, while in other embodiments, only one set of reactors is in service.

In a similar manner as discussed above with respect to FIG. 1A, in accordance with some embodiments, the controller 150 of system 100B may, for example, receive an indication of a flow rate and/or a TOC concentration or level and generate and transmit a drive signal to the source of persulfate 115 and/or the source actinic radiation housed within the reactor, for example, to adjust a rate at which the persulfate is introduced to the reactor 145, or adjust the dose of irradiation dispensed by the actinic radiation source. As noted above, the drive signal may be based on the one or more input signals and a target or predetermined value or set-point, or threshold value. For example, if the input signal that provides a representation of the TOC value of the contaminated groundwater 102 or second treated aqueous stream 106 is above the target TOC value or threshold value, or a range of acceptable TOC values, i. e., a tolerance range, then the drive signal can be generated to adjust the rate of persulfate 115 introduced to the reactor 145 and/or dose administered by the actinic radiation source, such as by adjusting at least one of the lamp configuration and the lamp intensity. In some embodiments, the controller 150 may also receive an indication of a persulfate amount or rate of addition, and generate and transmit a drive signal to reactor 145, a drive signal to the source of persulfate 115, and/or the actinic radiation source in response to the input signal associated with the persulfate amount, such as the persulfate concentration in one or more of the water streams of the system. According to some embodiments, the controller 150 may generate and transmit control signals to, for example, energize or adjust an intensity or power of output radiation emitted by the actinic radiation source within the reactor 145. Thus, depending on the amount or rate of addition of persulfate 115 and/or the level of TOC in the contaminated groundwater 102, the control signal may be increased or decreased appropriately, incrementally, or proportionally.

As discussed above, the controller 150 may be configured in a feedback arrangement and thus may be configured to generate and transmit one or more control signals to any one of the source of persulfate 115, actinic radiation source within the reactor 145, and/or the reactor 145 itself. For instance, the TOC value or the resistivity, or both, of the second treated aqueous solution 106 may be utilized to generate control signals to any of contaminated groundwater 102 and reactor 145. For instance, control signals to the reactor 145 may include control signals to the source of actinic radiation and/or to valves that allows water to enter and exit the reactor 145. Similarly to system 100A, a portion of the second treated aqueous solution 106 may be recirculated based on a measured TOC value taken from the second treated aqueous solution.

Figure 11:
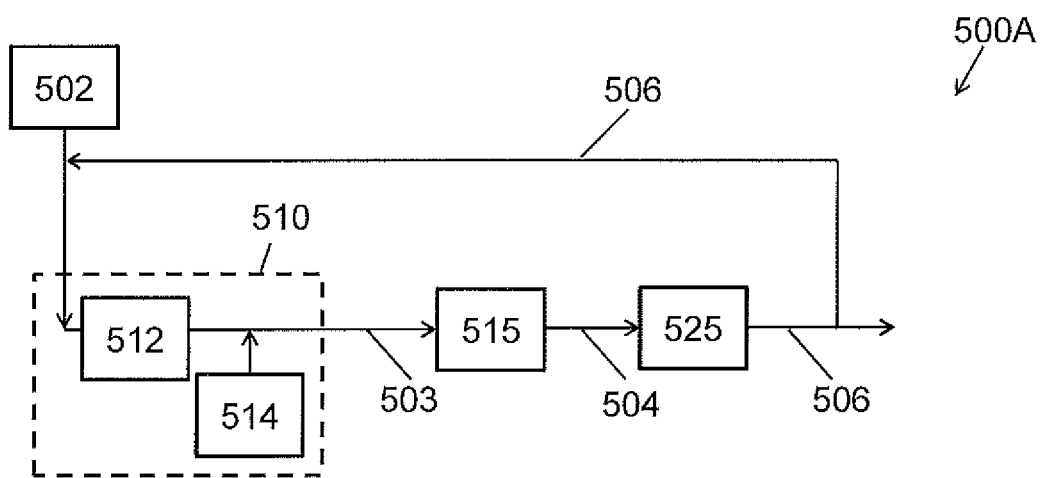
FIG. 11 is a schematic drawing illustrating a system in accordance with one or more embodiments.

Another embodiment, indicated generally at 500A, is provided in FIG. 11. The system 500A includes source of contaminated groundwater 502, source of persulfate 515, irradiation source 525, and associated fluid conduits 504 and 506, which are similar in structure and function to elements of the systems illustrated in FIGS. 1A and 1B. The pretreatment unit 510 of system 500A is capable of removing iron from an aqueous solution. In FIG. 11, the pretreatment unit 510 is capable and configured to remove iron from the contaminated groundwater 502. The source of persulfate 505 is fluidly connected downstream from the pretreatment subsystem 510 such that pretreated groundwater travels through conduit 503 from the pretreatment subsystem 510 to the source of persulfate 515.

The pretreatment subsystem 510 of system 500A includes media filter 512 and a source of an oxidant 514. However, the pretreatment subsystem 510 may include any unit configured to remove iron. The pretreatment subsystem may include one of the media filter 512 and the source of the oxidant 514.

The water treatment system 500A may include recirculation line 506 extending between a point downstream from the irradiation source 525 and a point upstream from the source of persulfate 515. As shown in FIG. 11, the recirculation line 506 may extend to a point upstream from the pretreatment subsystem 510. In other embodiments, the recirculation line may extend to a point between pretreatment subsystem 510 and source of persulfate 515.

Figure 12:
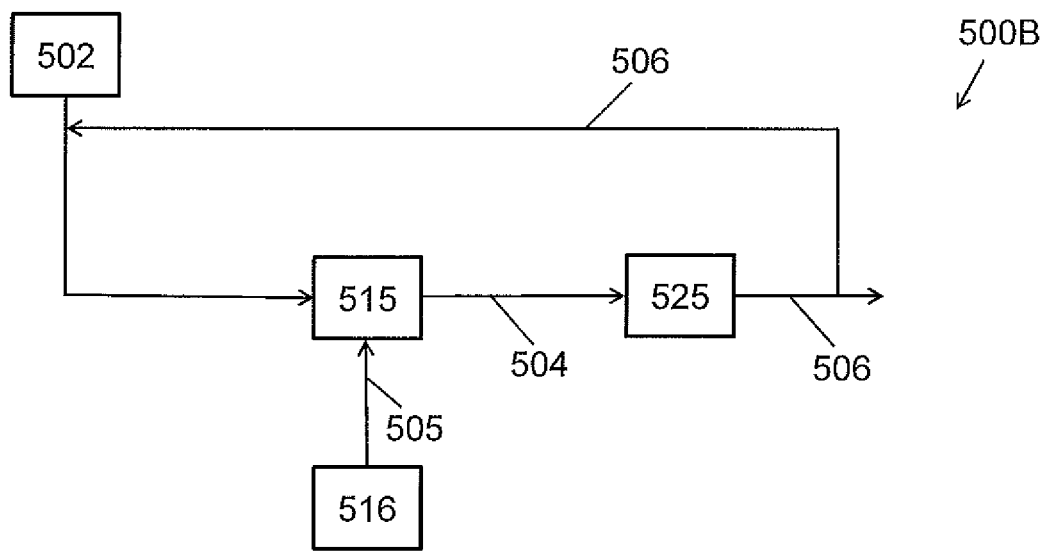
FIG. 12 is a schematic drawing illustrating a system in accordance with one or more embodiments.

Another embodiment, indicated generally at 500B, is provided in FIG. 12. The system 500B includes source of contaminated groundwater 502, source of persulfate 515, irradiation source 525, and associated fluid conduits 504 and 506, which are similar in structure and function to elements of the systems illustrated in FIG. 11. System 500B includes pretreatment subsystem 516 positioned upstream from the source of persulfate 515. The pretreatment subsystem 516 may be configured to produce high purity water for the source of persulfate 515. The pretreatment subsystem 516 may comprise a water purification unit configured to produce the high purity water. The water purification unit may be, for example, an ion exchange unit or a reverse osmosis unit, as previously described. Additionally or alternatively, the pretreatment subsystem 516 may be capable and configured to remove iron from a source of makeup water for the source of persulfate 516.

Figure 13:
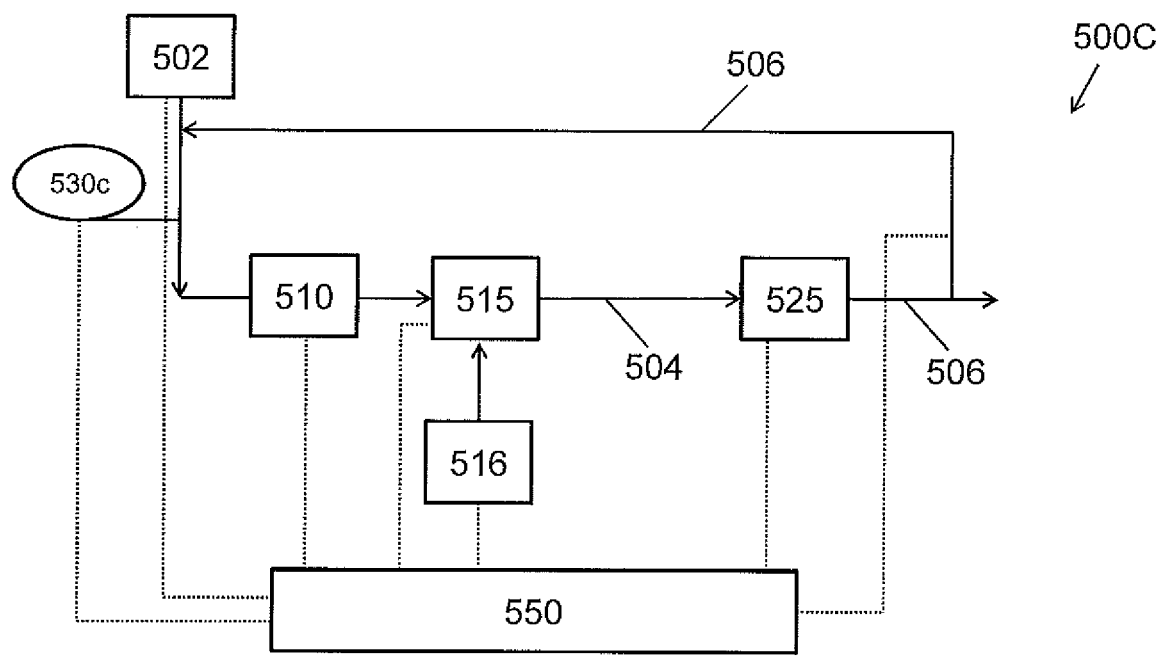
FIG. 13 is a schematic drawing illustrating a system in accordance with one or more embodiments.

Another embodiment, indicated generally at 500C, is provided in FIG. 13. The system 500C includes source of contaminated groundwater 502, source of persulfate 515, irradiation source 525, pretreatment subsystem 510, pretreatment subsystem 516, and associated fluid conduits 503, 504, and 506, which are similar in structure and function to elements of the systems illustrated in FIGS. 11 and 12. System 500C further includes controller 550 which is similar in structure and function to controller 150, described above with reference to FIGS. 1A and 1B. Controller 550 may be operatively connected to one or more elements of the system as previously described and to sensor 530c configured to measure a concentration of iron in the contaminated groundwater.

According to a further embodiment, the treatment systems disclosed herein may include a sensor that is configured to measure the concentration of persulfate. According to yet a further embodiment, the system may include a sensor that is configured to measure the concentration of a specific recalcitrant organic contaminant. For example, if the groundwater contains a halogenated contaminant, the sensor may be configured to detect the presence of the halogen. Other types of sensors are also within the scope of this disclosure.

Although not explicitly shown, the systems may further include one or more flow control devices, such as valves, regulators, pipes or other conduits, connectors, and weirs.

According to at least one embodiment, the systems disclosed herein, may be a mobile-based platform. The mobile-based system may be scalable, modular, and portable, which allows the system to be customized according to the site-specific remediation requirements. The mobile-based platform may be designed to be both transported and operated from mobile platforms that may be moved between sites and on-site. Multiple systems may also be used, in series or in parallel, depending on the remediation needs at the site. In certain instances the mobile-based platform may be designed and sized to fit standard sized shipping containers, or may be designed and sized to a custom enclosure or platform such as a skid or trailer that is able to be driven from location to location.

EXAMPLES

The systems and methods described herein will be further illustrated through the following examples, which are illustrating in nature and are not intended to limit the scope of the disclosure.

Example 1—Removal of 1,4-Dioxane Using Persulfate and UV Light

Figure 2:
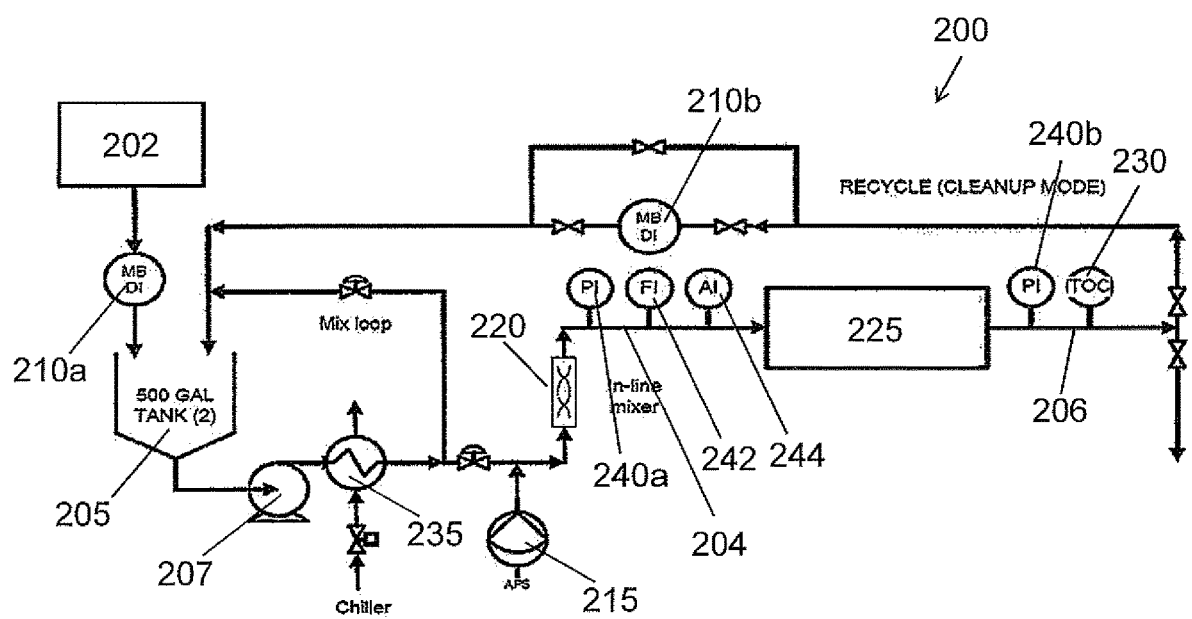
FIG. 2 is a schematic drawing illustrating a system in accordance with one or more embodiments.

FIG. 2 schematically illustrates a system 200 in accordance with one or more aspects, and within the context of the examples discussed below, illustrates a test set-up used to perform a series of experiments to test the effectiveness of ammonium persulfate and UV light on reducing concentrations of dioxane in water. The system 200 as shown in FIG. 2 included a tank 205, a pump 207, a chiller 235 for controlling temperature and to keep the UV source 225 from overheating, an in-line mixer 220 for mixing the contaminated water with the source of persulfate 215, a UV source 225 having a wavelength in a range from 185 nm to about 254 nm, chemical injection means for introducing a source of ammonium persulfate (APS) 215, two mixed bed deionizers 210a and 210b that function to remove unwanted ionic species, a Total Organic Carbon (TOC) analyzer 230, and multiple sensors, including pressure sensors 240a and 240b, flow meter 242, and conductivity sensor 244). System 200 is analogous to system 100A shown in FIG. 1A in that the source of persulfate 215 and the exposure to the UV source 225 are performed sequentially. For example, the persulfate 215 may be introduced to water containing contaminant 202 to produce a first treated aqueous solution 204, which may exposed to the source of UV light 225 to produce a second treated aqueous solution 206.

Although not specifically shown, aspects may include a controller that is configured to generate and transmit a control signal that adjusts a rate of heat transfer in chiller 235 based on, for example, an input signal from one or more sensors positioned within the system, such as a sensor positioned at an outlet of the pump 207. The control signal may increase or decrease the flow rate and/or the temperature of the cooling fluid introduced into the chiller 235 to provide water at a desired or predetermined temperature.

A controller may also generate and transmit a control signal that energizes pump 207 or adjusts a flow rate of the water flowing therethrough. For instance, if the pump utilizes a variable frequency drive, the control signal can be generated to appropriately adjust the pump motor activity level to achieve a target flow rate value. A pump may also be used to adjust the flow rate of the source of persulfate 215. Alternatively, an actuation signal may actuate a valve that regulates a rate of flow of the water exiting from pump 207, the proportion and/or flow rate of second treated aqueous stream 206 that is recycled back to tank 207, and the flow rate of the source of persulfate 215.

For this experiment, uncontaminated RO water was supplied having <10 ppb TOC. The hydraulic retention time (HRT) associated with the source of UV 225 was calculated using Equations 5 and 6 below using the parameters listed in Table 2 and modeling the lamp sleeve and reactor as a cylinder.

TABLE 2

| UV Lamp Sleeve Dimensions | UV Reactor Dimensions |
|---|---|
| Diameter = 1.62 inches | Diameter = 12 inches |
| Length = 42 inches | Length = 42 inches |
| Volume of Lamp Sleeve = 86.53 in$^3$ | Volume of Reactor = 4747.69 in$^3$ |
| Reactor flow rate = 7 gal/min | |
| (0.03 m$^3$/min) | |

$$\text{Net Volume of Reactor} = \text{Volume of Reactor} - \text{Volume of Lamp Sleeves} \quad \text{Equation 5}$$
$$= 4574.63 \text{ in}^3 (0.07 \text{ m}^3)$$

$$HRT = \text{Volume of Reactor}/\text{Flow rate} \quad \text{Equation 6}$$
$$= 2.83 \text{ minutes}$$

Figure 3:
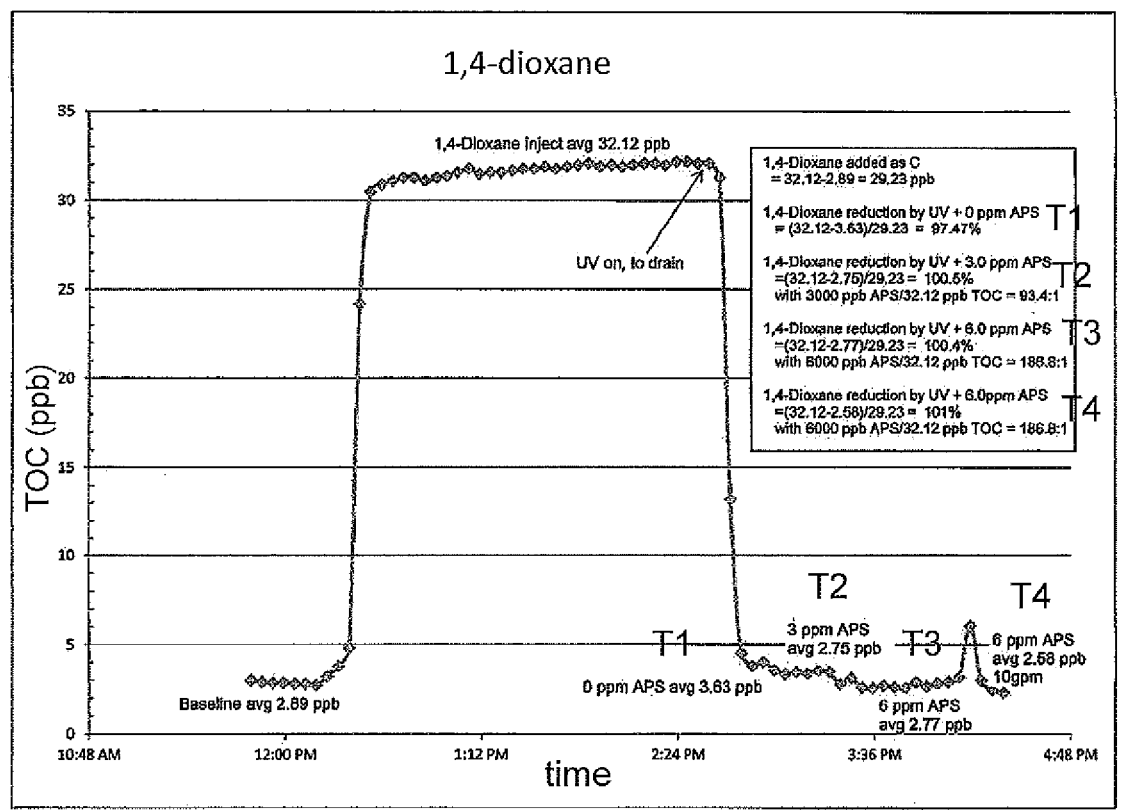
FIG. 3 is a graph showing the results from a first test conducted in accordance with one or more embodiments.
Figure 4:
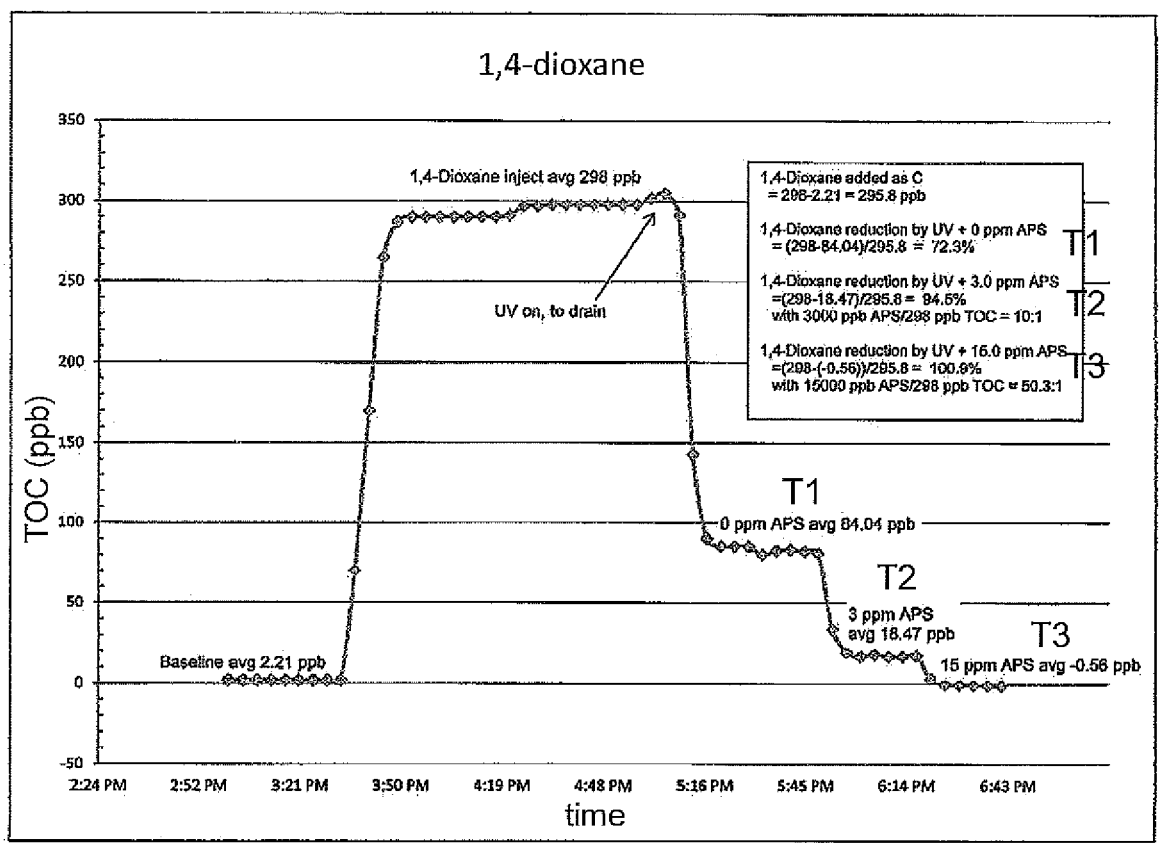
FIG. 4 is a graph showing the results from a second test conducted in accordance with one or more embodiments.
Figure 5:
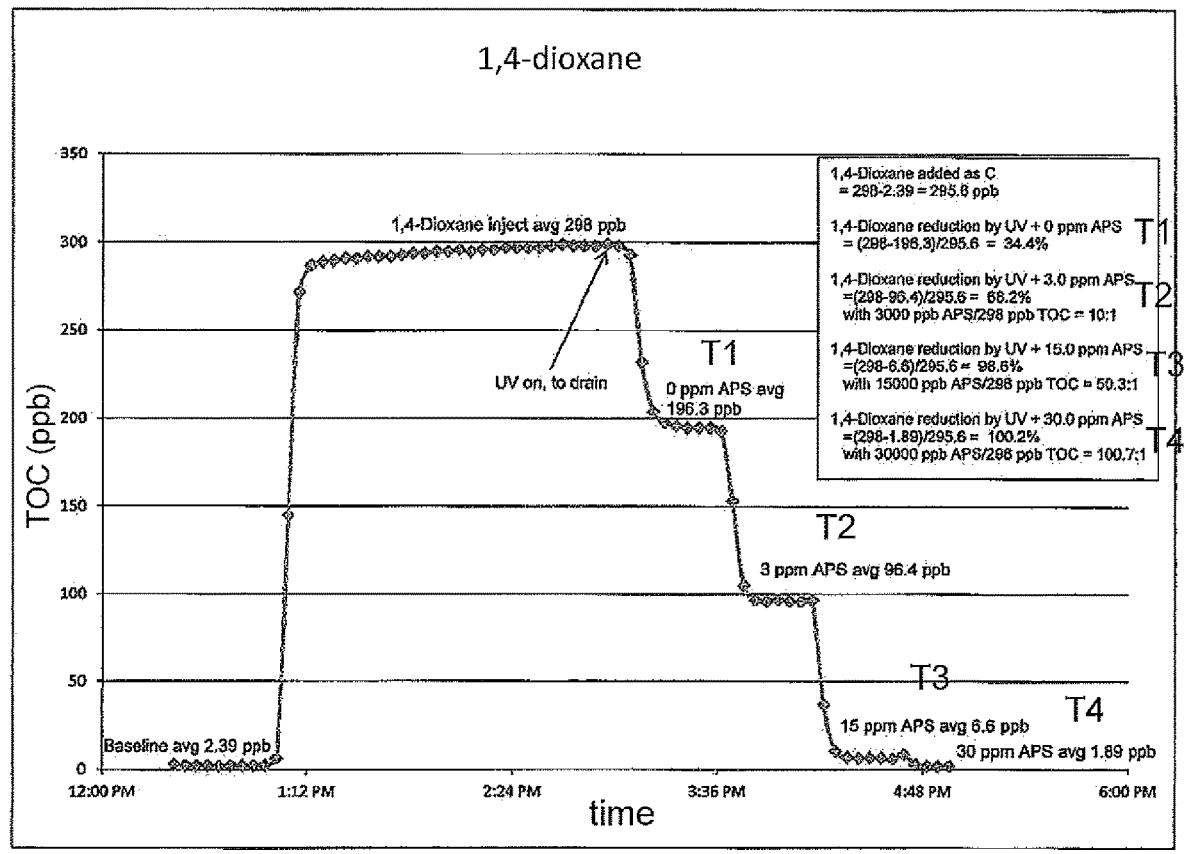
FIG. 5 is a graph showing the results from a third test conducted in accordance with one or more embodiments.

As noted above, the source of water was uncontaminated RO having <10 ppb TOC. This water was placed in the tank 205 and recirculated without persulfate 215 addition and with UV light 225 to obtain a baseline TOC. The UV light was turned off and 1,4-dioxane added and the TOC measurements were allowed to stabilize. The UV light 225 was turned on and the water was directed to drain. TOC measurements were performed to determine the effect of UV on 1,4-dioxane prior to the addition of ammonium persulfate (APS). APS was then added prior to the UV light and TOC measurements were performed. The results of the three tests are shown in FIGS. 3-5, respectively, under various test conditions and 1,4-dioxane concentrations. The test conditions, 1,4-dioxane concentrations, and results are summarized below in Tables 3-5. Data was collected for four concentration levels (T1, T2, T3, T4) of APS injection.

TABLE 3

Test 1 conditions and results for FIG. 3
Baseline TOC = 2.89 ppb
Dioxane concentration ($C_i$) = 29.23 ppb
TOC in ($TOC_i$) = 32.12 ppb
UV flowrate = 7 gpm (except at T3 = 10 gpm)
UV Lamp kW = 2.3, 2 lamps
UV dose = 10.95 kWh/1000 gallons (except at T4 = 7.67 kWh/1000 gallons)
T1 APS = 0 ppm, T2 APS = 3 ppm, T3 APS = 6 ppm, T4 APS = 6 ppm

|    | APS ratio | TOC out ($TOC_o$) | % TOC destruction | log $TOC_i/TOC_o$ | Dioxane Out ($C_o$) (ppb) | % Dioxane destruction | EE/O |
|----|-----------|-------------------|-------------------|-------------------|---------------------------|-----------------------|------|
| T1 | 0         | 3.63              | 88.7              | 0.95              | 0.74                      | 97                    | 11.6 |
| T2 | 93:1      | 2.75              | 91.4              | 1.07              | −0.14                     | 100                   | 10.3 |
| T3 | 187:1     | 2.77              | 91.4              | 1.06              | −0.12                     | 100                   | 10.3 |
| T4 | 187:1     | 2.58              | 92.0              | 1.10              | −0.31                     | 100                   | 7    |

The Electrical Energy per Order (EE/O) is a scale-up parameter and is a measure of the treatment obtained in a fixed volume of water as a function of exposure to UV light. EE/O is defined as the kilowatt hours of electricity required to reduce the concentration of a compound in 1000 gallons by one order of magnitude (or 90%). The unit for EE/O is kWh/1000 gallons/order (The UV/Oxidation Handbook, Solarchem Environmental Systems, Chapter 4, 1994). The linear relationship between the UV dose and the log of contaminant concentration implies that a single EE/O may completely describe the UV treatment characteristics of a contaminant. Thus, the lower the EE/O, the more efficient the treatment. The relationship also implies that it takes the same amount of energy to treat the first 90% of the contaminant as it does to treat the subsequent 90% of the remaining contaminant. UV treatment is therefore very efficient at reducing the mass loading of a contaminant and in certain instances may be used as a cost-effective pretreatment step.

The EE/O measured in a design test is specific to the water tested and to the compound of interest, and it will vary for different applications. Typical EE/O values for a range of organic contaminants are provided below in Table A. EE/O may make the scale-up and comparison of relative treatment performance a simple process. With the EE/O determined, either through design tests or estimated by using Table A, a UV dose required in a specific case may be calculated according to Equation 7:

$$\text{UV Dose} = \text{EE/O} \times \log(C_i/C_f) \qquad \text{Equation 7:}$$

where $C_i$ is the initial concentration, and $C_f$ is the anticipated or required discharge standard. For streams with several contaminants, the required energy is not additive but determined by the contaminant requiring the greatest UV dose.

TABLE A

Typical EE/O values for contaminant destruction

| Contaminant    | EE/O (kWh/1000 USgal/order) |
|----------------|-----------------------------|
| 1,4-dioxane    | 2-6                         |
| atrazine       | 30                          |
| benzene        | 2-5                         |
| chlorobenzene  | 5                           |
| DCE            | 2-5                         |
| NDMA           | 2-5                         |
| PCE            | 3-8                         |
| PCP            | 10                          |
| phenol         | 5                           |
| TCE            | 2-4                         |
| toluene        | 2-5                         |
| xylene         | 2-5                         |
| vinyl chloride | 2-3                         |

TABLE 4

Test 2 conditions and results for FIG. 4
Baseline TOC = 2.21 ppb
Dioxane concentration ($C_i$) = 293.79 ppb
TOC in ($TOC_i$) = 296
UV flowrate = 7 gpm
UV Lamp kW = 2.3, 2 lamps
UV dose = 10.95 kWh/1000 gallons
T1 APS = 0 ppm, T2 APS = 3 ppm, T3 APS = 15 ppm

|    | APS ratio | TOC out ($TOC_o$) | % TOC destruction | log $TOC_i/TOC_o$ | Dioxane Out ($C_o$) (ppb) | % Dioxane destruction | EE/O |
|----|-----------|-------------------|-------------------|-------------------|---------------------------|-----------------------|------|
| T1 | 0         | 84                | 71.6              | 0.55              | 81.79                     | 72                    | 20.0 |
| T2 | 10:1      | 18.5              | 93.8              | 1.20              | 16.29                     | 95                    | 9.1  |
| T3 | 50:1      | 0.5               | 99.8              | 2.77              | −1.71                     | 100                   | 4.0  |

TABLE 5

Test 3 conditions and results for FIG. 5
Baseline TOC = 2.39 ppb
Dioxane concentration ($C_i$) = 293.61 ppb
TOC in ($TOC_i$) = 296
UV flowrate = 7 gpm
UV Lamp kW = 2.3, 1 lamp
UV dose = 5.48 kWh/1000 gallons
T1 APS = 0 ppm, T2 APS = 3 ppm, T3 APS = 15 ppm, T4 APS = 30 ppm

|    | APS ratio | TOC out ($TOC_o$) | % TOC destruction | log $TOC_i/TOC_o$ | Dioxane Out ($C_o$) (ppb) | % Dioxane destruction | EE/O |
|----|-----------|-------------------|-------------------|-------------------|---------------------------|----------------------|------|
| T1 | 0         | 196.3             | 33.7              | 0.18              | 193.91                    | 34                   | 30.7 |
| T2 | 10:1      | 96.4              | 67.4              | 0.49              | 94.01                     | 68                   | 11.2 |
| T3 | 50:1      | 6.6               | 97.8              | 1.65              | 4.21                      | 99                   | 3.3  |
| T4 | 100:1     | 1.89              | 99.4              | 2.19              | −0.50                     | 100                  | 2.5  |

The results indicate that it is possible to essentially remove all of the 1,4-dioxane when using a combination of persulfate and UV light. The results also indicate that persulfate and UV light is effective at removing both lower (30 ppb) and higher (300 ppb) concentrations of dioxane from contaminated water and concentration values of APS as low as 3 ppm were effective at lowering the concentration of dioxane. Prior attempts to treat dioxane and other organic contaminants have included in-situ injection methods of persulfate without the use of UV and were not nearly as effective as the ex-situ methods and systems disclosed herein.

Example 2—Destruction of TOC for Various Contaminants

An experiment was conducted to test the effectiveness of using UV light alone versus using persulfate in combination with UV light in reducing the concentration of 10 different organic contaminants (including dioxane) in water. Most of the listed organics in Table 6 are recalcitrant organic contaminants.

Figure 6:
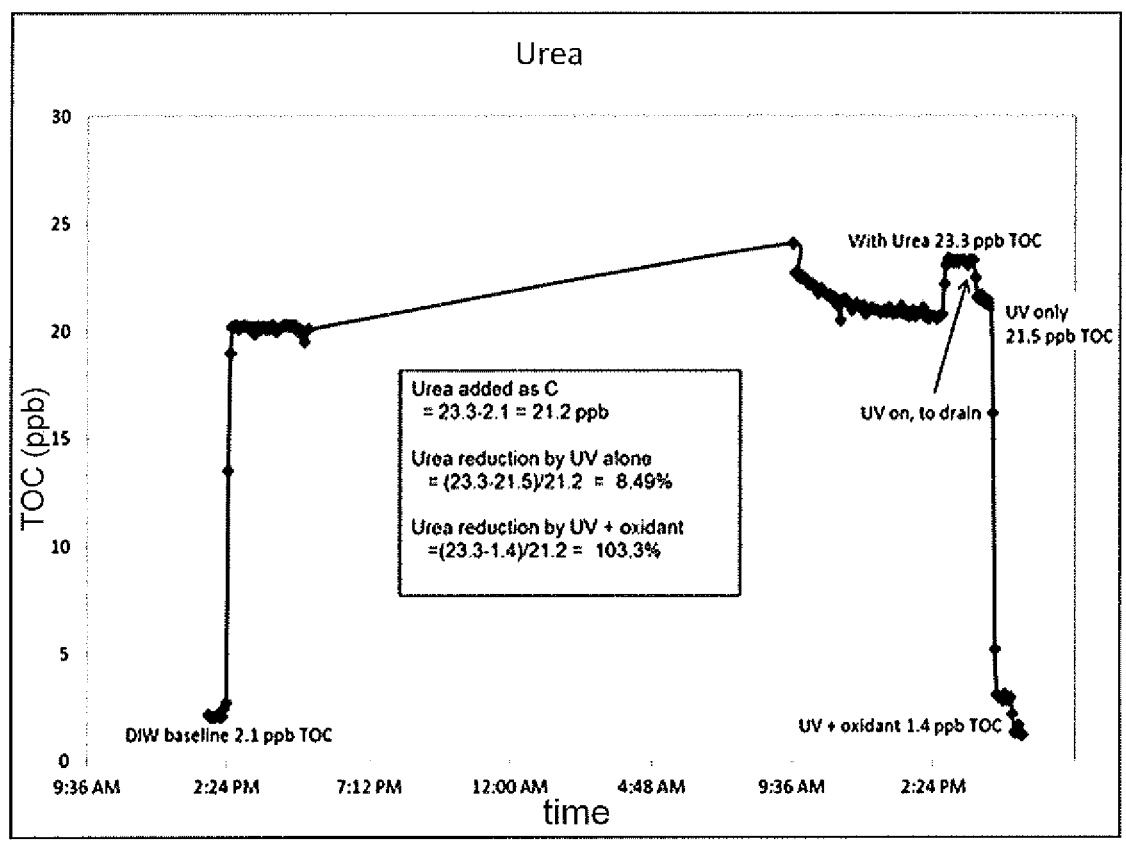
FIG. 6 is a graph showing the results from a fourth test conducted in accordance with one or more embodiments.
Figure 7:
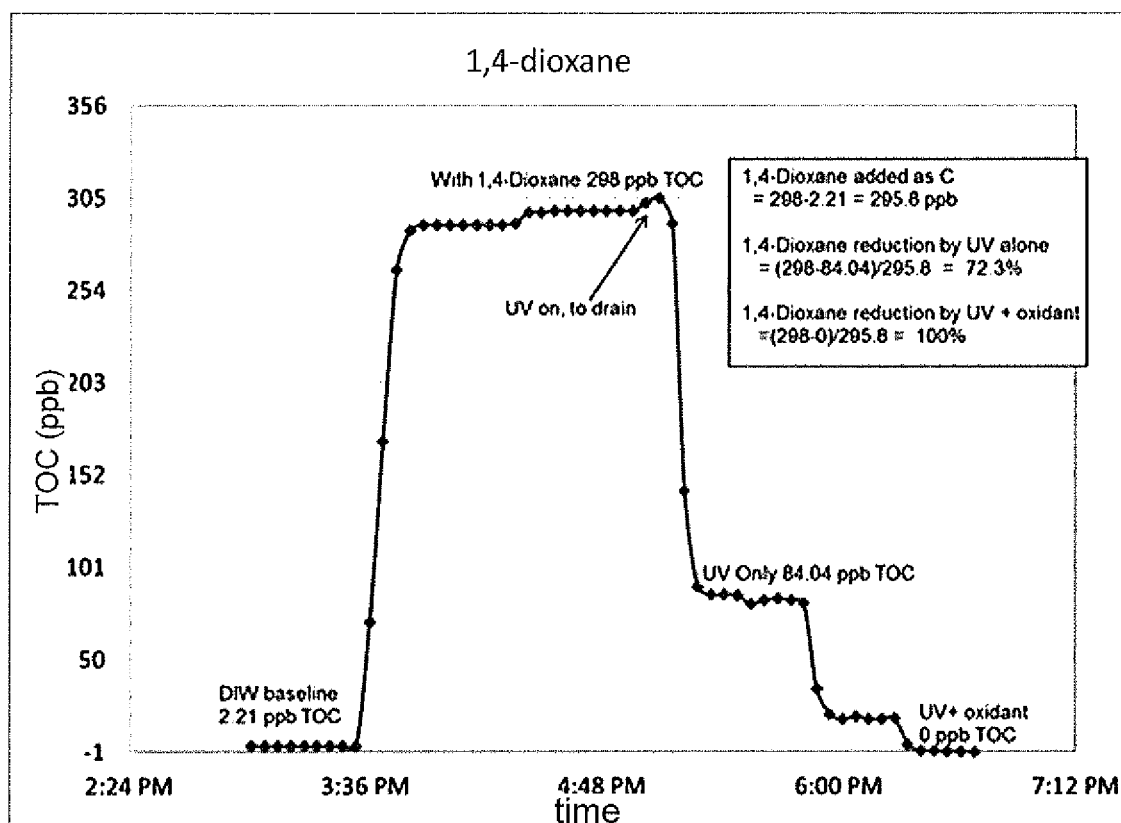
FIG. 7 is a graph showing the results from a fifth test conducted in accordance with one or more embodiments.

The test was set up according to a system set up as a 1.5 m³/h pilot apparatus and was similar to system 200 shown in FIG. 2. The flow rate was about 1-2 m³/h and the UV source 225 contained two medium pressure lamps operated at a lamp power of 3.5 kW each and at the same wavelength as used in Example 1. RO water was processed by a mixed bed deionizer to provide source water having <10 ppb TOC. This water was placed in the tank 205 and recirculated at a rate of 10 gpm without persulfate 215 (APS) addition and with UV light 225 to obtain a baseline TOC of 2-3 ppb. The UV light was then turned off and the target contaminant was added and the TOC measurements were allowed to stabilize. The UV light 225 was turned on and the flow rate was reduced to 1.6 m³/h and the water was directed to drain. TOC measurements were made with and without APS injection. The results shown in Tables 6 and 7 below show the results of the test and reflect the effect on TOC levels when UV is used alone versus when persulfate is used in combination with UV. FIG. 6 graphically displays the results obtained from urea, and FIG. 7 graphically displays the results from 1,4-dioxane.

TABLE 6

Contaminant concentrations and results

| | | % TOC Destruction | |
|---|---|---|---|
| Contaminant | Feed ppb | UV only | UV + APS |
| atrazine    | 25  | 70  | 99  |
| carbaryl    | 29  | 95  | 100 |
| chloroform  | 29  | 97  | 100 |
| formic acid | 30  | 100 | —   |
| 1,4-dioxane | 296 | 72  | 100 |
| humic acid  | 33  | 90  | 99  |
| IPA         | 30  | 77  | 100 |
| starch      | 33  | 94  | 100 |
| tryptophan  | 29  | 94  | 100 |
| urea        | 21  | 9   | 100 |

TABLE 7

IPA concentrations and results

| Contaminant: IPA | % TOC Destruction | |
|---|---|---|
| Feed IPA ppb | UV only | UV + APS |
| 100  | 84 | 100 |
| 250  | 61 | 100 |
| 500  | 34 | 100 |
| 1000 | 15 | 100 |

The results indicate that in just over half the contaminants, nearly complete (99-100%) destruction of the organic species was accomplished by exposure to UV light alone. Urea showed the lowest reduction, with less than 10% destruction achieved using only UV. However, nearly complete destruction (99-100%) was achieved for all the contaminants by using persulfate in combination with UV light in a single pass. Thus, EPA or other regulatory standards for contaminants can be met using the ex-situ methods and systems disclosed herein in a single pass.

Example 3—Destruction of TOC for Various Recalcitrant Organic Contaminants

A second experiment was conducted to test the effectiveness of using UV light alone versus using persulfate in combination with UV light in reducing the concentration of three different recalcitrant organic contaminants (including dioxane) in water. A test apparatus similar to the one used in Example 2 and as exemplified in FIG. 2 was used to perform these experiments, and the same procedure was followed.

The source water used in this experiment had a background alkalinity of 300 ppm, and the persulfate used in this case was sodium persulfate (SPS). Table 8 below summarizes the results of the test and reflect the effect on TOC levels when UV is used alone versus when persulfate is used in combination with UV for the three recalcitrant organic contaminants that were tested.

TABLE 8

Contaminant concentrations and results

| Recalcitrant organic contaminant | Initial TOC ppb | Sodium persulfate/ TOC | % TOC Destruction UV only | UV + sodium persulfate |
|---|---|---|---|---|
| 1,4-dioxane | 300 | 100 | 73 | 99 |
| 1,2-dichloroethane | 300 | 100 | 39.5 | 73 |
| trichloroethylene | 300 | 0 | >99.9 | |

The results indicate that nearly complete destruction of TOC using UV alone was only exhibited for trichloroethylene. Nearly complete destruction of TOC for dioxane was observed. A lower flowrate and/or a higher persulfate ratio may increase the destruction of TOC for the 1,2-dichloroethane.

Prophetic Example 1—Effect of Removal of Iron from Feed Stream on Removal of Contaminants Contaminated groundwater may be pretreated before introduction of a persulfate solution. The contaminated groundwater may have an iron concentration of about 10 mg/L. The iron concentration may be reduced by about 99% before being combined with a persulfate solution. The contaminated groundwater may then be treated by the methods disclosed herein. The contaminated groundwater may have a final concentration of 1,4-dioxane of less than 1 ppb. Accordingly, the pretreatment operation disclosed herein may enhance removal of recalcitrant organic contaminates, such as 1,4-dioxane, from contaminated groundwater.

Prophetic Example 2—Effect of Removal of Iron from Feed Stream UV Quartz Sleeve Maintenance Contaminated groundwater may be pretreated before introduction of a persulfate solution. The contaminated groundwater may have an iron concentration of about 10 mg/L. The iron concentration may be reduced by about 99% before being combined with a persulfate solution. The contaminated groundwater may then be treated by the methods disclosed herein. With the removal of iron from the contaminated groundwater, the UV lamp quartz sleeve may foul at a slower rate. The UV lamp quartz sleeve may be operated for twice as long before the fouling adversely affects the system. Accordingly, the pretreatment operation disclosed herein may improve operation of the wastewater treatment system by reducing downtime.

The systems and methods disclosed herein are thus capable of completely removing recalcitrant organic contaminant from groundwater using an ex-situ method and system in a single pass. The results also indicate that the systems and methods are capable of handling background alkalinity, i. e., groundwater having various levels of alkalinity. Alkaline components and other reaction products may have the potential to interfere with the reaction of persulfate with the contaminant. These results indicate that these potential side reactions did not interfere with the effectiveness of the TOC removal.

The aspects disclosed herein are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope.

Having thus described several aspects of at least one example, it is to be appreciated that various alterations, modifications, and improvements will readily occur to those skilled in the art.

For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for treating contaminated groundwater, comprising:
   a pretreatment subsystem capable of removing iron from an aqueous solution;
   a source of persulfate fluidly connectable to a source of contaminated groundwater having an initial concentration of a recalcitrant organic contaminant, the source of persulfate fluidly connected downstream from the pretreatment subsystem and configured to introduce the persulfate to the contaminated groundwater and produce a first treated aqueous solution; and
   an irradiation source fluidly connected downstream from the source of persulfate, the irradiation source configured to irradiate the first treated aqueous solution and produce a second treated aqueous solution having a concentration of the recalcitrant organic contaminant lower than the initial concentration of the recalcitrant organic contaminant.

2. The system of claim 1, wherein the pretreatment subsystem is fluidly connectable downstream from the source of contaminated groundwater and is configured to remove iron from the contaminated groundwater prior to introduction of the persulfate.

3. The system of claim 2, wherein the pretreatment subsystem comprises a media filter.

4. The system of claim 2, wherein the concentration of iron downstream of the pretreatment subsystem is 0.1 mg/L or less.

5. The system of claim 2, wherein the pretreatment subsystem comprises a source of an oxidant.

6. The system of claim 5, wherein the source of the oxidant comprises chlorine or an oxygen containing gas.

7. The system of claim 1, wherein the pretreatment subsystem comprises a water purification unit and is configured to produce high purity water for the source of persulfate.

8. The system of claim 7, wherein the water purification unit comprises an ion exchange unit or a reverse osmosis unit.

9. The system of claim 1, further comprising
a TOC concentration sensor fluidly connected to the contaminated groundwater; and
a controller operably connected to the TOC concentration sensor and configured to control at least one of a rate at which the persulfate is introduced to the contaminated groundwater and a dose of irradiation applied by the irradiation source based on an output signal from the TOC concentration sensor.

10. The system of claim 1, wherein the system is a mobile-based platform.

11. The system of claim 1, further comprising a pump configured to extract the contaminated groundwater from the source of contaminated groundwater.

12. The system of claim 11, wherein the source of contaminated groundwater is a remediation site.

13. The system of claim 1, wherein the irradiation source is configured to produce the second treated aqueous solution having a concentration of the recalcitrant organic contaminant that is at least 50% less than the initial concentration of recalcitrant organic contaminant.

14. The system of claim 13, wherein the irradiation source is configured to produce the second treated aqueous solution having a concentration of the recalcitrant organic contaminant that is at least 99% less than the initial concentration of recalcitrant organic contaminant.

15. The system of claim 14, wherein the recalcitrant organic contaminant is 1,4-dioxane and the irradiation source is configured to produce the second treated aqueous solution having a concentration of the recalcitrant organic contaminant of 1 ppb or less.

16. The system of claim 1, further comprising a recirculation line extending between a point downstream from the irradiation source and a point upstream from the source of persulfate.

17. The system of claim 16, wherein the point upstream from the source of persulfate is upstream from the pretreatment subsystem.

18. A method of treating contaminated groundwater having an initial concentration of a recalcitrant organic contaminant and an initial concentration of iron, comprising:
pretreating the contaminated groundwater to produce a pretreated groundwater having a concentration of iron less than the initial concentration of iron;
introducing a persulfate to the pretreated groundwater to produce a first treated aqueous solution; and
exposing the first treated aqueous solution to irradiation to produce a second treated aqueous solution having a concentration of the recalcitrant organic contaminant that is at least 50% less than the initial concentration of recalcitrant organic contaminant,
wherein the concentration of recalcitrant organic contaminant in the second treated aqueous solution is at least 99% less than the initial concentration of contaminant, and
wherein the recalcitrant organic contaminant is 1,4-dioxane and the concentration of the recalcitrant organic contaminant in the second treated aqueous solution is 1 ppb or less.

19. The method of claim 18, further comprising extracting the contaminated groundwater from a remediation site.

20. The method of claim 18, further comprising:
measuring a total organic carbon (TOC) value of the contaminated groundwater to be treated; and
adjusting at least one of a rate at which the persulfate is introduced to the contaminated groundwater and a dose of the irradiation based on the measured TOC value.

* * * * *